(12) United States Patent
Nam et al.

(10) Patent No.: US 12,520,158 B2
(45) Date of Patent: Jan. 6, 2026

(54) ELECTRONIC APPARATUS FOR SUPPORTING USER LOGIN AND OPERATING METHOD THEREOF

(71) Applicant: Samsung Electronics Co., Ltd., Suwon-si (KR)

(72) Inventors: Sangsu Nam, Suwon-si (KR); Boram Bae, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 302 days.

(21) Appl. No.: 18/115,923

(22) Filed: Mar. 1, 2023

(65) Prior Publication Data
US 2023/0209355 A1    Jun. 29, 2023

Related U.S. Application Data

(63) Continuation of application No. PCT/KR2022/017428, filed on Nov. 8, 2022.

(30) Foreign Application Priority Data

Dec. 13, 2021  (KR) .................. 10-2021-0177720
Jan. 24, 2022  (KR) .................. 10-2022-0010044

(51) Int. Cl.
*H04W 12/63*     (2021.01)
*H04W 12/33*     (2021.01)

(52) U.S. Cl.
CPC ........... *H04W 12/63* (2021.01); *H04W 12/33* (2021.01)

(58) Field of Classification Search
CPC ..... H04W 12/63; H04W 12/33; H04W 12/06; H04W 12/64; G01S 7/006; G01S 13/765; G06F 21/32; G06F 21/35
See application file for complete search history.

(56) References Cited

U.S. PATENT DOCUMENTS 8,725,113 B2  5/2014  Gargi et al.
9,276,914 B2  3/2016  Woodward et al.
(Continued)

FOREIGN PATENT DOCUMENTS

EP    3349106 A1    7/2018
JP    6726426 B     7/2020
(Continued)

OTHER PUBLICATIONS

Extended European Search Repot corresponding to Application No. EP22907713.6; Issue Date Nov. 4, 2024.
(Continued)

*Primary Examiner* — Diane D Mizrahi
(74) *Attorney, Agent, or Firm* — CANTOR COLBURN LLP

(57) ABSTRACT

Disclosed are an electronic device for supporting user login and a method for operating the same. A wearable electronic device according to various embodiments may include a communication circuit, a positioning sensor, and a processor. The processor may receive identification information of an application from an external electronic device via short-range wireless communication, and identify an automatic login range of the application based on the received identification information and pre-stored location-based login information. The processor may measure or detect a distance between a user wearing the wearable electronic device and the external electronic device through the positioning sensor, and transmit user information for logging in to the external electronic device, based on the measured distance being within the automatic login range of the application. In addition, various other embodiments are possible.

20 Claims, 15 Drawing Sheets

(56) References Cited

U.S. PATENT DOCUMENTS

| | | |
|---|---|---|
| 11,184,153 B2 | 11/2021 | Hammerschmidt et al. |
| 11,311,774 B2 * | 4/2022 | Choi .................. G16H 40/67 |
| 2007/0249288 A1 | 10/2007 | Moallemi et al. |
| 2010/0093278 A1 | 4/2010 | Abel et al. |
| 2016/0050531 A1 | 2/2016 | Choi et al. |
| 2016/0294817 A1 | 10/2016 | Tan et al. |
| 2016/0381038 A1 | 12/2016 | Disraeli |
| 2017/0031451 A1 | 2/2017 | Jin |
| 2018/0359797 A1 | 12/2018 | Dua |
| 2020/0342086 A1 | 10/2020 | Oung et al. |
| 2022/0137204 A1 | 5/2022 | Nguyen et al. |
| 2023/0032366 A1 | 2/2023 | Lee et al. |

FOREIGN PATENT DOCUMENTS

| | | |
|---|---|---|
| KR | 20130022430 A | 3/2013 |
| KR | 20130105467 A | 9/2013 |
| KR | 20160008448 A | 1/2016 |
| KR | 20160030797 A | 3/2016 |
| KR | 20160137648 A | 11/2016 |
| KR | 20170058258 A | 5/2017 |
| KR | 20190026328 A | 3/2019 |
| KR | 20190028134 A | 3/2019 |
| KR | 102017632 B | 10/2019 |
| KR | 20200028827 A | 3/2020 |
| KR | 102209523 B | 2/2021 |
| KR | 20210049913 A | 5/2021 |
| KR | 20210127388 A | 10/2021 |
| WO | 2022092861 A1 | 5/2022 |

OTHER PUBLICATIONS

International Search Report and Written Opinion for International Application No. PCT/KR2022/017428; International Filing Date Nov. 8, 2022; Date of Mailing Feb. 23, 2023; 3 Pages.

Korean Office Action corresponding to Application No. 10-2022-0010044; Dated Nov. 24, 2025.

European Office Action corresponding to Application No. EP22907713.6; Dated Oct. 29, 2025.

\* cited by examiner

User A

| Device | App ID | User ID | User PW | Range (cm) |
|---|---|---|---|---|
| Device 1 | AAA | aaa | 1234 | 100 |
| | AAA | aab | 5678 | 100 |
| | BBB | aaa | 7890 | 200 |
| Device 2 | AAA | aaa | 1234 | 100 |
| | AAA | aab | 5678 | 100 |
| | BBB | aaa | 7890 | 200 |

ELECTRONIC APPARATUS FOR SUPPORTING USER LOGIN AND OPERATING METHOD THEREOF

CROSS-REFERENCE TO RELATED APPLICATIONS

This application is a continuation application, claiming priority under § 365(c), of International Application No. PCT/KR2022/017428, filed on Nov. 8, 2022, which is based on and claims the benefit of Korean patent application number 10-2022-0010044 filed on Jan. 24, 2022, in the Korean Intellectual Property Office and of Korean patent application number 10-2021-0177720, filed on Dec. 13, 2021, in the Korean Intellectual Property Office, the disclosures of which are incorporated by reference herein in their entireties.

TECHNICAL FIELD

Various embodiments of this document relate to an electronic device for supporting user login and an operating method thereof.

BACKGROUND ART

Electronic devices may be implemented in various types (e.g., a smartphone, a mobile terminal, a tablet, a wearable device (e.g., a smart watch or smart glasses), or an Internet of things (IoT) device) and interact with each other.

For example, a wearable device such as a smart watch may operate independently or operate as a peripheral device which interworks with another electronic device (e.g., a smartphone or an Internet of things device). Since the wearable device is wearable on the human body, a user's biometric data (e.g., a heart rate or body temperature) or motion data may be acquired at any time or in real time, and the user may be provided with a signal in an intuitive method (e.g., a haptic output such as a vibration).

A wearable device (e.g., a smart watch) may have a relatively small screen size compared to that of another electronic device (e.g., a smartphone or a smart TV), and may interwork with a wide screen of the other electronic device to provide a service so as to improve a service quality or user satisfaction.

For use of a personalized service through an electronic device, a user login procedure may be required.

For example, as various services (e.g., an exercise service, a game service, or a streaming service) are provided through multiple applications installed in an electronic device (e.g., a smartphone or a wearable device), user login may be requested to use each service.

For example, the electronic device may display an application execution screen for requesting login, and the user may access a personal account of the corresponding application by inputting the user his/her ID and password through the screen.

DISCLOSURE

Technical Problem

Since a user needs to log in repeatedly each time the user uses a service through an electronic device, the user may have inconvenience of always remembering and inputting an ID and password for each login. A security problem may occur when the electronic device is configured with automatic login using a cache or the like for the convenience of the user.

A user may have an inconvenience of performing an input procedure for login using a device in an imperfect touch input environment. For example, in a case of a smart TV, inputting the ID and password using a remote control as an input device may be inconvenient.

In a case of a login method using biometrics, the types of applicable devices may be limited. For example, login using biometrics may not be possible on an Internet of things device (e.g., a smart TV or smart refrigerator) in which a biometric sensor is not installed.

In an environment in which multiple devices interact with each other, a user login procedure may become more important for efficient service.

In addition, when multiple users share a single device, there may be inconvenience in that each user has to log in each time, and for security reasons, each user has to log out each time.

Technical Solution

Various embodiments disclosed in this document may provide an electronic device for improving the convenience and efficiency of user login, and an operating method thereof.

Various embodiments disclosed in this document may provide an electronic device for enabling a user to log in at a proper timing according to a change in a user's location, and an operating method thereof.

Various embodiments disclosed in this document may provide an electronic device for enhancing the precision of user location-based services by improving positioning accuracy, and an operating method thereof.

Various embodiments disclosed in this document may provide an electronic device for improving responsiveness by adaptively changing conditions for executing login according to characteristics of a service, and an operating method thereof.

Various embodiments disclosed in this document may provide an electronic device for improving the convenience and efficiency of user login in an environment supporting multi-user login and/or in a multi-device interworking environment, and an operating method thereof.

A wearable electronic device according to various embodiments may include a communication circuit for short-range wireless communication, a positioning sensor, and at least one processor operatively connected to the communication circuit and the positioning sensor. The at least one processor may be configured to receive identification information of an application from an external electronic device via the short-range wireless communication, identify an automatic login range of the application based on the identification information of the application and pre-stored location-based login information, measure a location of the wearable electronic device with respect to the external electronic device through the positioning sensor, and transmit user information for a user's login to the external electronic device, based on the measured location being included in the automatic login range.

A method for operating a wearable electronic device according to various embodiments may include: receiving identification information of an application from an external electronic device via short-range wireless communication; identifying an automatic login range of the application based on the identification information of the application and pre-stored location-based login information; measuring a position of the wearable electronic device with respect to the external electronic device through a positioning sensor of the wearable electronic device; and transmitting user information for a user's login to the external electronic device, based on the measured location being included in the automatic login range.

An electronic device according to various embodiments may include: a display; a communication circuit for short-range wireless communication; a positioning sensor; and at least one processor operatively connected to the display, the communication circuit, and the positioning sensor. The at least one processor may be configured to display a first execution screen of an application through the display while a first user wearing a first wearable electronic device is logged in to a first account of the application, detect a login event of a second user wearing a second wearable electronic device, based on whether the location of the second user is included in an automatic login range for the application, execute the second user's login to a second account of the application according to detection of the login event of the second user, and display a second execution screen of the application through the display according to execution of a multi-user login including the first user and the second user.

Advantageous Effects

According to various embodiments disclosed in this document, the convenience and efficiency of user login may be improved.

According to various embodiments disclosed in this document, user login or logoff may be performed based on a change in user location.

According to various embodiments disclosed in this document, the precision of user location-based services may be enhanced by improving positioning accuracy.

According to various embodiments disclosed in this document, responsiveness may be improved by adaptively changing conditions for executing login according to the characteristics of a service.

According to various embodiments disclosed in this document, the convenience and efficiency of user login may be improved in an environment supporting multi-user login and/or in a multi-device interworking environment.

According to various embodiments disclosed in this document, automatic logout in response to user movement may be implemented to improve convenience or security.

In addition, various effects directly or indirectly identified through this document may be provided.

DESCRIPTION OF DRAWINGS

FIG. 10 is an example of location-based login information according to an embodiment.

MODE FOR INVENTION

Hereinafter, various embodiments are described with reference to the accompanying drawings.

Figure 1:
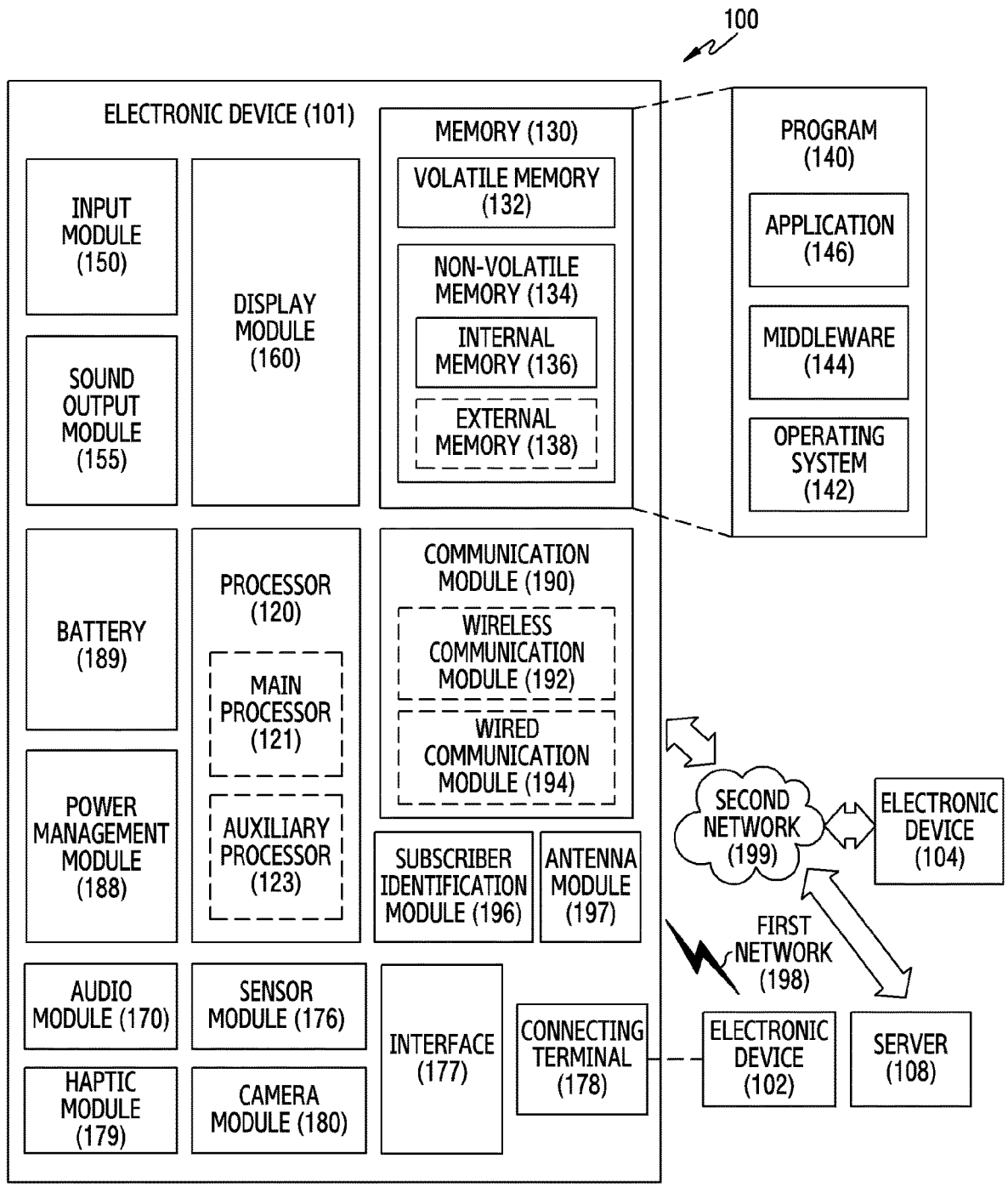
FIG. 1 is a block diagram of an electronic device in a network environment according to various embodiments.

FIG. 1 is a block diagram of an electronic device in a network environment, according to various embodiments;

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
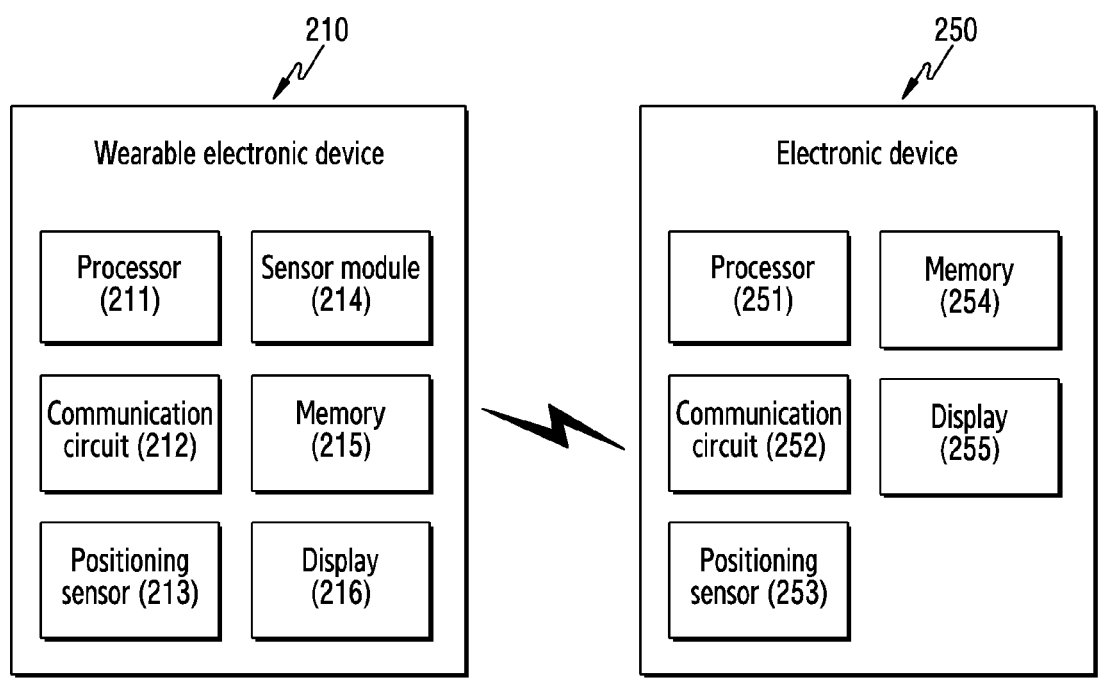
FIG. 2 is a block diagram of a system including a wearable electronic device according to an embodiment.

FIG. 2 is a block diagram of a system including a wearable electronic device according to an embodiment.

In an embodiment, a wearable electronic device 210 and an electronic device 250 may interact with each other for automatic login. The wearable electronic device 210 and the electronic device 250 may be heterogeneous devices. For example, the wearable electronic device 210 may be a wearable type device (e.g., a smart watch, smart glasses, or a smart ring). The electronic device 250 may be an Internet of things (IoT) device (e.g., a smart TV, a smart speaker, or a smart refrigerator). However, the type of the electronic device 250 is not limited thereto, and the electronic device 250 may include any type of device capable of performing user authentication and/or login. The electronic device 250 may be an external electronic device of the wearable electronic device 210. For example, the wearable electronic device 210 and the electronic device 250 may have different platform environments (or operating systems).

In an embodiment, the wearable electronic device 210 may be a subject for executing (or triggering or supporting) user login. The electronic device 250 may be a subject for providing a service through an application by logging in to a user account for the application (or a user account of the application) during a login operation of the wearable electronic device 210.

Referring to FIG. 2, the wearable electronic device 210 according to an embodiment may include a processor 211, a communication circuit 212, a positioning sensor 213, and/or a memory 215. The wearable electronic device 210 may further include a sensor module 214 and/or a display 216. In some embodiments, at least one of the elements of the wearable electronic device 210 may be omitted, some elements may be integrated, or other elements may be additionally provided. For example, when the wearable electronic device 210 is a smart ring type device, the display 216 may be omitted. As another example, the positioning sensor 213 may be operatively and/or electrically connected to the sensor module 214 or the communication circuit 212, or may be implemented integrally with the sensor module 214 or the communication circuit 212.

At least a part of the processor 211, the communication circuit 212, the positioning sensor 213, the memory 215, and/or the display 216 included in the wearable electronic device 210 may be electrically and/or operatively connected to each other so as to exchange signals (such as commands or data) with each other.

The wearable electronic device 210 may include at least some of the components of the electronic device 101 illustrated in FIG. 1. For example, the processor 211 may correspond to the processor 120 (one of 121 or 123) of FIG. 1. The communication circuit 212 may correspond to or include the communication module 190 of FIG. 1. The sensor module 214 may correspond to the sensor module 176 of FIG. 1 or include a portion thereof. The memory 215 may include at least a portion of the memory 130 of FIG. 1. The display 216 may correspond to the display module 160 of FIG. 1.

In an embodiment, the wearable electronic device 210 may be worn by a user. The wearable electronic device 210 may support a user login procedure through the electronic device 250. The electronic device 250 may interact with the wearable electronic device 210 to recognize a user of the wearable electronic device 210 and execute a login procedure for the user.

In some embodiments, the wearable electronic device 210 may transmit only user information for a login procedure through the electronic device 250, and may communicate with the electronic device 250 through a short-distance wireless communication connection without a direct login procedure for an application-related user account (or a user account of the application). For example, the wearable electronic device 210 may perform a user login through the electronic device 250 and then interact with the electronic device 250 through a short-range wireless communication connection so as to be used as an input interface of the electronic device 250.

In some embodiments, multiple logins for the same user (e.g., the same user account of the same application) may be performed on both sides of the wearable electronic device 210 and the electronic device 250. As used herein "both sides" refers to both sides of the communication/connection between a first device (e.g., wearable electronic device 210) and a second device (e.g., electronic device 250). For example, based on the location of the wearable electronic device 210 worn by the user (or user location) being included in an automatic login range of an application, user login is performed on both sides of the wearable electronic device 210 and the electronic device 250, and thus a corresponding user account may be activated and/or synchronized on the two electronic devices 210 and 250.

In an embodiment, the processor 211 may include at least one processor. For example, the processor 211 may include at least one of an application processor and a sensor hub processor.

The processor 211 may be configured to execute and/or control various functions supported by the wearable electronic device 210. The processor 211 may control at least a part of the communication circuit 212, the positioning sensor 213, the sensor module 214, the memory 215, and the display 216. The processor 211 may be configured to execute an application by executing a code written in a programming language stored in the memory 215 of the wearable electronic device 210, and to control various hardware. For example, the processor 211 may be configured to execute an application (e.g., an exercise app, a schedule app, a game app, a video streaming app, a home app, a portal app, or a search app) to support and/or provide an automatic login function using the application. An application executed in the wearable electronic device 210 may operate independently or in conjunction with an external electronic device. For example, and without limitation, the external electronic device may be the electronic device 250 (e.g., an Internet of Things device) or the server 108 of FIG. 1.

As instructions stored in the memory 215 are executed, an operation of the processor 211 may be performed.

In an embodiment, the communication circuit 212 may support a short-range wireless communication connection of the wearable electronic device 210. For example, the communication circuit 212 may support a connection via short-range wireless communication (e.g., Bluetooth, Bluetooth low energy (BLE), wireless fidelity (Wi-Fi), infrared data association (IrDA), or an ultra-wideband (UWB)) between the wearable electronic device 210 and the electronic device 250.

In an embodiment, the sensor module 214 may include at least one sensor. For example, the sensor module 214 may include a motion sensor (e.g., a gesture sensor, a gyro sensor, an acceleration sensor, or a grip sensor) and/or a biometric sensor (e.g., a photoplethysmography (PPG) sensor, an electrocardiography (ECG) sensor, a galvanic skin response (GSR) sensor, a bioelectrical impedance analysis (BIA) sensor, a bioelectrode, or a temperature (body temperature) sensor).

In an embodiment, the wearable electronic device 210 may include the positioning sensor 213. The processor 211 may provide and/or support a positioning function through and/or communication with the positioning sensor 213. The positioning sensor 213 may include a UWB sensor.

For example, as a user wearing the wearable electronic device 210 approaches the electronic device 250 (e.g., within a first distance), a short-range wireless communication connection between the wearable electronic device 210 and the electronic device 250 may be established. Thereafter, as the user approaches the electronic device 250 closer (e.g., within a second distance), the UWB sensor may operate to accurately measure or determine the user's location (the distance and/or angle from the user).

The UWB sensor may improve positioning accuracy through precise temporal resolution using short pulses ranging from 3.1 to 10.6 GHz bandwidth. In a case of using the UWB sensor, precise distance measurement in units of several centimeters is possible and angle measurement is also possible, and therefore positioning accuracy may be improved by using other short-range wireless communication methods (e.g., Bluetooth, Wi-Fi, or BLE beacon). As such, the relative position of the electronic devices may be accurately determined.

Through the UWB sensor, it is possible to precisely identify whether a user enters a designated service area or within a specified login range, and an automatic login procedure may be performed at an efficient timing according to the location or movement of the user so as to provide a personalized service to the user. For example, when a user moves in a narrow place (e.g., indoors or at home), the service efficiency may be further improved through precise location measurement. In addition, when multiple users exist in a predetermined service area, it is possible to provide a rich service by accurately identifying the location of each user.

In an embodiment, the processor 211 may be configured to connect short-range wireless communication (e.g., Bluetooth, BLE, Wi-Fi, IrDA, or UWB) between the wearable electronic device 210 and the electronic device 250 through the communication circuit 212.

In an embodiment, the wearable electronic device 210 may include a UWB module for a positioning function and/or a short-range wireless communication function. As an example, the UWB module may operate as the positioning sensor 213 (or UWB sensor) to provide a positioning function. As another example, the UWB module may be included in the communication circuit 212 to provide a short-range wireless communication function. As another example, the UWB module may be independently implemented to provide a positioning function and/or a short-range wireless communication function under the control of the processor 211. Further still, in embodiments where the UWB module is included with or operating as the communication circuit 212 or the positioning sensor 213, such UWB module may also provide the other function of positioning and/or communication, and thus provide dual function even when integrated into one or the other of the more specified functional components.

In an embodiment, the processor 211 may be configured to first detect information (e.g., device ID) of the electronic device 250 that is nearby via short-range wireless communication (Bluetooth, BLE, Wi-Fi, or IrDA), and then to activate the UWB module based on the detected information. Accordingly, it is possible to improve positioning accuracy by using the UWB module and, at the same time, reduce battery consumption by preventing the long-term use of the UWB module.

In an embodiment, the processor 211 of the wearable electronic device 210 may receive identification information of an application (hereinafter, also referred to as an 'app') from the electronic device 250 through a short-range wireless communication connection. The application may correspond to one of an application being executed on the electronic device 250, an application being executed in the foreground of the electronic device 250, an application most recently executed on the electronic device 250, or an application waiting for user login through the electronic device 250. For example, the processor 211 of the electronic device 250 may transmit a login response request including identification information (e.g., an app ID) of an application (e.g., exercise app) through the communication circuit 212 in order to perform automatic login to the application.

In an embodiment, the processor 211 may be configured to identify an automatic login range of the application based on the application identification information (e.g., an app ID) received from the electronic device 250 and pre-stored location-based login information.

In an embodiment, the pre-stored location-based login information may include information on an automatic login range for each application or an automatic login range for each application characteristic (e.g., type or attribute).

For example, the location-based login information may be stored locally in the memory 215 of the wearable electronic device 210 or stored locally in the memory 215 of the electronic device 250.

For example, the processor 211 may be configured to extract an automatic login range corresponding to the ID of the application (e.g., exercise app) received from the pre-stored location-based login information, the type of the ID of the application (e.g., exercise app), or the attribute of the ID of the application (e.g., exercise app).

In an embodiment, the processor 211 may be configured to measure or determine a location of the wearable electronic device 210, which is worn by the user, with respect to the external electronic device 250 through the positioning sensor 213 (e.g., a UWB sensor). The location of the wearable electronic device 210 (or the location of the user wearing the wearable electronic device 210) measured or determined through the positioning sensor 213 (e.g., a UWB sensor) may correspond to a relative position based on the external electronic device 250. The location (or user location) of the wearable electronic device 210 may include at least one of a distance between the wearable electronic device 210 and the external electronic device 250 and an angle between the wearable electronic device 210 and the external electronic device 250. As such, relative position in a three-dimensional space may be obtained between the wearable electronic device 210 and the external electronic device 250. The angle may be determined based on a preset or predefine facing of the external electronic device 250 (e.g., front of a smart TV or other appliance; primary direction of a speaker; or the like). The angle may be based, in part, upon a predefined facing or other property/characteristic of the external electronic device 250.

In an embodiment, the memory 215 of the wearable electronic device 210 may include user information (e.g., a user ID, a user password, a token, and/or biometric authentication information (e.g., a fingerprint, voice, or a face image)) for a user's login.

In an embodiment, the processor 211 may be configured to transmit user information for login to the electronic device 250 through the communication circuit 212 based on the location of the wearable electronic device 210 worn by the user (e.g., the distance and/or angle between the wearable electronic device 210 and the electronic device 250) being included in an automatic login range. The user information for login may include information required for identification and/or authentication of the user (e.g., user ID, user password, token, and/or biometric authentication information (e.g., fingerprint, voice, or face image)).

When the location (or user location) of the wearable electronic device 210 is included in the automatic login range of the application, user information for login may be transmitted from the wearable electronic device 210 to the electronic device 250. An automatic login procedure using the user information may be executed in the electronic device 250. When the location (or user location) of the wearable electronic device 210 is out of the automatic login range of the application, user information for login may not be transmitted. The automatic login procedure may not be executed in the electronic device 250.

In an embodiment, the processor 211 of the wearable electronic device 210 worn by the user may support automatic login through the electronic device 250. The processor 211 may support the electronic device 250 to perform user login using the user information by transmitting user information for logging in to the electronic device 250.

According to an embodiment, the processor 211 of the wearable electronic device 210 may be configured to transmit only user information required for the user login through the electronic device 250, and the wearable electronic device 210 may be configured to communicate with the electronic device 250 through a short-range wireless communication connection without a direct login procedure for an account related to an application (or a user account of the application).

According to an embodiment, multi-login for the same user (e.g., the same user account of the same application) may be performed on both sides of the wearable electronic device 210 and the electronic device 250.

For example, the processor 211 of the wearable electronic device 210 may be configured to execute a user login through the wearable electronic device 210, based on the location (or user location) of the wearable electronic device 210 with respect to the electronic device 250 being included in the automatic login range of the application (e.g., exercise app). For example, the processor 211 may be configured to transmit user information to the electronic device 250 through a short-range wireless communication connection so as to support user login through the electronic device 250, and to access and/or authenticate the corresponding user information on the wearable electronic device 210 so as to cause multi-login of the same user to be executed through the two electronic devices 210 and 250.

According to some embodiments, the same application may be simultaneously executed on both the wearable electronic device 210 and the electronic device 250. For example, while a designated app (e.g., an exercise app or an app having an AppID of AAA) is being executed on the electronic device 250, an app (e.g., a mobile version of an exercise app or an app having an AppID of AAA) corresponding to the designated app may be executed on the wearable electronic device 210.

In an embodiment, the processor 211 of the wearable electronic device 210 may be configured to perform at least one of requesting a logout of the user from the electronic device 250 through a short-range wireless communication connection, and executing the logout of the user on the wearable electronic device 210, based on the location (or user location) of the wearable electronic device 210 with respect to the electronic device 250 being out-of-the range of the automatic login range of the application (e.g., exercise app).

Referring to FIG. 2, the electronic device 250 according to an embodiment may include a processor 251, a communication circuit 252, a positioning sensor 253, a memory 254, and/or a display 255. The processor 251, the communication circuit 252, the positioning sensor 253, the memory 254, and/or the display 255, which are elements of the electronic device 250, may correspond to the processor 211, the communication circuit 212, the positioning sensor 253, the sensor module 214, the memory 215, and/or the display 216, which are elements of the wearable electronic device 210, respectively. Therefore, the description of overlapping functions or operations will be omitted.

The processor 251 of the electronic device 250 may be configured to connect short-range wireless communication with the wearable electronic device 210 through the communication circuit 252.

In an embodiment, the processor 251 of the electronic device 250 may be configured to execute a login procedure when a designated automatic login condition is satisfied. The automatic login condition may include a condition for the user's location. The automatic login condition may be configured in various methods according to the characteristics of an application or the characteristics of a service provided through the application.

For example, in connection with a first application (e.g., a game app), when a user of the wearable electronic device 210 located within a predetermined distance executes the first application in the electronic device 250 by using an input interface (e.g., a remote control) of the electronic device 250 and accesses the initial screen of the first application, the processor 251 of the electronic device 250 may be configured to determine that the automatic login condition of the first application is satisfied. When the automatic login condition of the first application is satisfied, the processor 251 may be configured to execute a login procedure for the first application.

As another example, monitoring whether the wearable electronic device 210 approaches the electronic device 250 and/or a distance between the wearable electronic device 210 and the electronic device 250 may be continuously (or periodically) checked in the background (or a standby mode) by a second application (e.g., an assistant app) running on the electronic device 250 (e.g., a smart speaker). When the user of the wearable electronic device 210 comes within a predetermined distance, the processor 251 of the electronic device 250 may be configured to determine that the automatic login condition of the second application is satisfied. The processor 251 may be configured to switch the execution environment of the second application from the background to the foreground (or from the standby mode to a normal mode) according to satisfaction of the automatic login condition of the second application and perform a login procedure for the second application.

As another example, when a user of the wearable electronic device 210 executes a third application (e.g., an exercise app) on the wearable electronic device 210 and approaches the third application within a predetermined distance while being logged in to the third application, the processor 251 of the electronic device 250 may determine that the automatic login condition of the third application is satisfied. When the automatic login condition of the third application is satisfied, the processor 251 may be configured to execute the third application on the electronic device 250 so as to perform a login procedure for the third application.

In an embodiment, user information for login may be stored on both sides of the wearable electronic device 210 and the electronic device 250, or stored on one side and shared with the other device.

In an embodiment, the processor 251 of the electronic device 250 may be configured to execute a login procedure using user information received from the wearable electronic device 210.

For example, the login procedure may correspond to a procedure of automatically inputting user information (e.g., user ID, user password, token, or user information) received from the wearable electronic device 210 into a login window displayed on the screen so as to perform identification and/or authentication of a user. Login may also be referred to as log-on or connection start (or sign-on).

As the login is executed, it is possible to connect to, access, or use the user account of the application. For example, information about the user account of the application may be stored locally in the memory 254 of the electronic device 250, may be stored on a server for providing a service through the application (e.g., the server 108 in FIG. 1, an exercise service server, a video streaming service server, or a portal service server), or may be stored in the memory 254 of the electronic device 250 and the server in a distributed manner.

After the user's login procedure is completed, the processor 251 may display a guide message notifying of the user's login success through the display 255. After logging in, the processor 251 may be configured to communicate with the wearable electronic device 210 through a short-distance wireless communication connection so as to provide a service using the application (e.g., an exercise service, a game service, a video streaming service, a scheduling service, or a health care service) to the logged-in user.

In an embodiment, the processor 251 may be configured to provide and/or support a positioning function through the positioning sensor 253 of the electronic device 250. The positioning sensor 253 may include a UWB sensor.

In an embodiment, the UWB sensor of the wearable electronic device 210 may operate as one of a tag and an anchor, and the UWB sensor of the counterpart electronic device 250 may operate as the other one of the tag and the anchor. Based on the relationship between the anchor and the tag, it may be possible to accurately measure or determine a distance and/or angle between the wearable electronic device 210 and the electronic device 250. A method of measuring a distance and/or an angle using the UWB sensor will be described in more detail with reference to FIG. 4.

In an embodiment, the processor 251 may be configured to transmit a login response request for user login requesting user information required for login, and then when the user information for login is not received within a designated time, display an error message indicating a login failure.

In an embodiment, the automatic login range may be identified based on application information. The application information may include at least one of application identification information (e.g., an app ID or an app group ID) and application characteristic information (e.g., information about an application type or attribute).

For example, the automatic login range may be configured differently for each application or for each application characteristic.

In an embodiment, a designated service area or a designated login range may be different according to the type of application or the type of service provided through the application. According to an embodiment, by applying different automatic login ranges for each application (or application characteristics), an efficient automatic login function may be provided according to the type of service.

For example, when the user desires to use an exercise app, the designated distance for an exercise service between the user and the electronic device 250 (e.g., a smart TV) may be a first distance (e.g., 1 to 2 m). In this case, the first distance may be configured as an automatic login range for the exercise app (or a characteristic of the exercise app). When the exercise app is executed in the electronic device 250 and the user comes within the first distance, the user's automatic login to the exercise app may be executed. If the user does not come within the first distance, automatic login may not be executed.

As another example, when the user comes out of the living room after waking up in the morning, the electronic device 250 (e.g., a smart speaker) located in the living room may be turned on to execute a schedule app, and may provide a scheduling service that guides by voice the user's schedule for the day identified through the schedule app. Automatic login of the user may be required for the scheduling service. A designated distance between the user and the electronic device 250 (e.g., a smart speaker) for determining whether to perform automatic login may be a second distance (e.g., 2 to 3 m). In this case, the second distance may be configured as an automatic login range for the schedule app (or an app group to which the schedule app belongs). When the user comes within the second distance, the schedule app is executed in the electronic device 250 to perform automatic login of the user, and the user's schedule for the day may be provided. If the user does not come within the second distance, the electronic device 250 may be maintained in a standby state.

As another example, when a user wearing the wearable electronic device 210 (e.g., a smart watch) comes out of the first room to the living room, an electronic device 250 (e.g., a smart TV) placed in the living room may recognize that the user has approached within the automatic login range for the first app (e.g., a video streaming app), and execute automatic login. When the user goes back to the second room, another electronic device 250 (e.g., smart audio) placed in the second room may recognize that the user has approached within the automatic login range for the second app (e.g., a schedule app) and execute automatic login, to thereby provide a service to the user by using the second app.

As another example, when the automatic login range for a home app (or health app) of the electronic device 250 (e.g., a smart refrigerator) is designated as the first distance, and user A approaches within the first distance, the electronic device 250 may recognize the user A and automatically log in to the user A's account registered in the home app. The electronic device 250 may identify health information of the user A through the home app, and display information on a diet or food ingredients based on the identified health information through the display 255 of the electronic device 250. When user B approaches within the first distance, the electronic device 250 may automatically log in to the user B's account through the home app and display information about a diet or food ingredients suitable for the user B.

In an embodiment, an application that is a target of location-based automatic login may correspond to one of an application being executed on the electronic device 250, an application being executed in the foreground of the electronic device 250, an application most recently executed on the electronic device 250, or an application waiting for user login through the electronic device 250.

In an embodiment, an application that is a target of location-based automatic login may correspond to an application for which a location-based automatic login function (optional) is configured. For example, when the user activates the automatic login function for the designated app, the automatic login procedure may be performed based on the user entering the automatic login range of the designated app.

In an embodiment, user information about multiple users may be stored in the memory 254 of the electronic device 250. For example, the processor 251 may be configured to identify a user accessing the electronic device 250 by comparing user information received from the wearable electronic device 210 with user information stored in the memory 254.

In some embodiments, the memory 254 of the electronic device 250 may store all user information required for the user's login (e.g., user identification and authentication information such as a name, a user ID, a user password, a token, or biometric authentication information).

In some embodiments, only some of the user information (e.g., user identification information such as a name or user ID) may be stored.

In some embodiments, the processor 211 of the wearable electronic device 210 may be configured to request a logout of the user from the electronic device 250, based on the location (or user location) of the wearable electronic device 210 with respect to the electronic device 250, the location being out of the automatic login range of the application. The processor 251 of the electronic device 250 may be configured to execute logout in response to the request.

In some embodiments, the processor 251 of the electronic device 250 may be configured to, when the user of the wearable electronic device 210 is out of the automatic log-in range of the application, execute logout independently regardless of the logout request of the wearable electronic device 210.

In an embodiment, the processor 211 of the wearable electronic device 210 may be configured to measure or determine a distance and an angle between the user and the electronic device 250 together through the positioning sensor 213. The processor 211 may be configured to transmit user information for logging in to the electronic device 250 based on the measured distance and angle being included in the automatic login range of the application. The processor may be configured to accurately measure the distance and angle using the UWB sensor in a convenient method. When the distance and angle are considered together, the automatic login range of the application may be more precisely controlled according to the nature of the application.

For example, in a case of the first app for providing a video streaming service, a first automatic login range suitable for viewing (e.g., a distance from the smart TV to the user is within 1.5 m, and an angle between the smart TV and the user is from 0° (front) to within 30°) may be configured.

As another example, in a case of a second app that provides an exercise service or an audio service, a second automatic login range (e.g., a distance from the smart TV to the user is within 2 m, and an angle between the smart TV and the user is within 60°), which is wider than the first automatic login range, may be configured.

In an embodiment, when the user's account for the application is unregistered, the processor 211 of the wearable electronic device 210 may be configured to transmit an account registration request including user information. The processor 251 of the electronic device 250 may be configured to execute a user registration procedure using the user information in response to the account registration request.

In an embodiment, the sensor module 214 of the wearable electronic device 210 may further include at least one of a motion sensor and a biosensor. The processor 211 of the wearable electronic device 210 may be configured to transmit information (e.g., motion data (e.g., gesture), biometric data (e.g., heart rate, blood pressure, body temperature, or calories burned)) measured through at least one of the motion sensor and the biosensor to the electronic device 250 via short-range wireless communication. After automatically logging in to the user account of the application, the electronic device 250 may provide services (e.g., exercise service, scheduling service, game service, or video streaming service) of the application by using the motion data and/or biometric data transmitted from the wearable electronic device 210.

In an embodiment, when the automatic login range corresponding to the identification information of the designated application is not included (or is unregistered) in the pre-stored location-based login information, a fixed default value regardless of the application may be used as the automatic login range of the application.

Figure 3A:
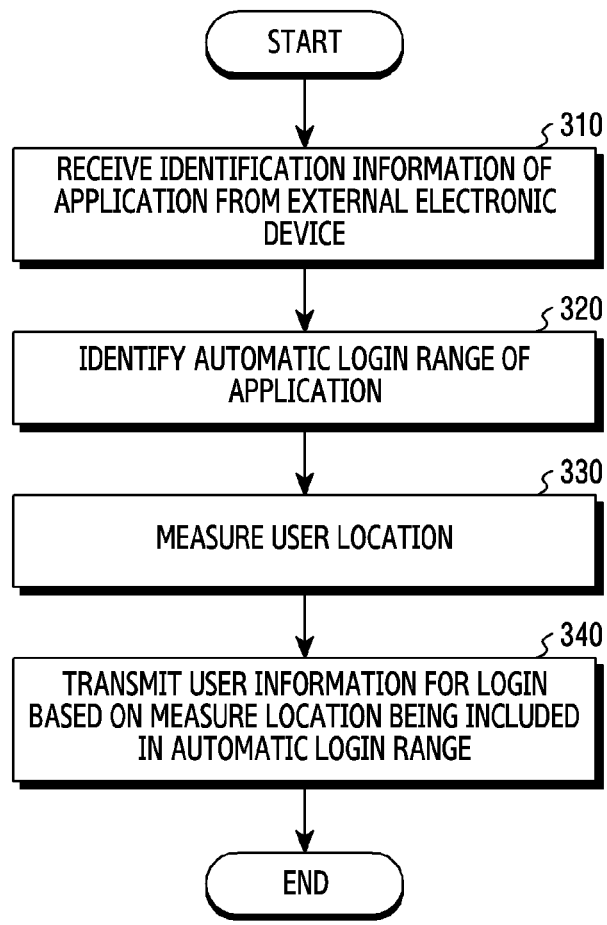
FIG. 3A is a flowchart illustrating a method for operating a wearable electronic device according to an embodiment.

FIG. 3A is a flowchart illustrating a method for operating a wearable electronic device according to an embodiment.

The method of FIG. 3A may be performed by the wearable electronic device 210 (e.g., a smart watch) of FIG. 2. For example, at least a part of the method of FIG. 3A may be performed by the wearable electronic device 210, the processor of the wearable electronic device 210 (e.g., the processor 211 of FIG. 2), a software module (e.g., at least one of a login manager module 1111, a UWB location service module 1113, and a UWB framework module 1115 shown in FIG. 11) having been stored in the memory 215 of the wearable electronic device 210 and executed by the processor 211, or an application (e.g., an exercise app, a schedule app, a game app, a streaming app, a home app, a portal app, or a search app) executed in the wearable electronic device 210. In some embodiments, at least one of the operations of the method illustrated in FIG. 3A may be omitted, the order of some operations may be changed, and/or other operations may be added.

In the embodiment of FIG. 3A, the wearable electronic device 210 may be worn by the user. The wearable electronic device 210 may be connected to the electronic device 250 (e.g., a smart TV) via short-range wireless communication (e.g., Bluetooth, BLE, Wi-Fi, or IrDA).

In an embodiment, the wearable electronic device 250 worn by the user may be configured to support an automatic login operation of the electronic device 250 or perform an autonomous automatic login operation, based on the location of the wearable electronic device itself (or the user's location) with respect to the electronic device 250, the location being included within the automatic login range of a designated application (e.g., exercise app).

In an embodiment, the wearable electronic device 210 may be configured to support an automatic logoff operation of the electronic device 250 or perform an autonomous automatic logoff operation, based on the location of the wearable electronic device itself (or the user's location) with respect to the electronic device 250, the location being out of the automatic login range of a designated application (e.g., exercise app).

Referring to FIG. 3A, an operating method of the wearable electronic device 210 according to an embodiment may include operations 310, 320, 330, and 340.

In operation 310, the wearable electronic device 210 (e.g., a smart watch) may receive application identification information from the electronic device 250 (e.g., a smart TV) via short-range wireless communication.

In an embodiment, the application may correspond to one of an application being executed in the electronic device 250, an application being executed in the foreground of the electronic device 250, an application most recently executed in the electronic device 250, an application waiting for user login on the electronic device 250, or an application for which a location-based automatic login function (optional) is configured.

For example, the electronic device 250 may be configured to transmit a login response request including identification information (e.g., an app ID) of the application in order to automatically log in to an application (e.g., an exercise app). The wearable electronic device 210 may be configured to receive the login response request from the electronic device 250.

In operation 320, the wearable electronic device 210 may be configured to identify an automatic login range based on the application identification information received from the electronic device 250 and pre-stored location-based login information.

In an embodiment, the pre-stored location-based login information may include information on an automatic login range for each application or information on an automatic login range for each application characteristic (e.g., type or attribute).

For example, the wearable electronic device 210 may be configured to extract an application (e.g., an exercise app) ID received from the pre-stored location-based login information or a group ID to which the application (e.g., an exercise app) belongs, or an automatic login range corresponding to the characteristic (e.g., type or property) the application (e.g., an exercise app).

In operation 330, the wearable electronic device 210 (e.g., a smart watch) may be configured to measure or determine a location (or user location) of the wearable electronic device 210 worn by the user, with respect to the electronic device 250 (e.g., a smart TV), through a positioning sensor. The measured or determined location may include a distance and/or an angle between the wearable electronic device 210 and the electronic device 250 worn by the user.

For example, the UWB sensor of the wearable electronic device 210 may operate as an anchor and perform UWB communication with the UWB sensor of the electronic device 250, which operates as a tag, so as to measure or determine a location (distance and/or angle) of the wearable electronic device 210 with respect to the electronic device 250.

In operation 340, the wearable electronic device 210 may be configured to, based on the location of the wearable electronic device 210, which is measured or determined in operation 330, being included in the automatic login range of the application identified through operation 320, transmit user information for logging in to the electronic device 250. The user information for login may include information required for identification and/or authentication of the user (e.g., at least a part of a user ID, a user password, a token, or biometric authentication information (e.g., a fingerprint, voice, or a face image)).

When the location of the wearable electronic device 210 (e.g., the distance and/or angle between the user and the electronic device 250) is included in the automatic login range of the application, user information for login may be transmitted. When the location of the wearable electronic device 210 (e.g., the distance and/or angle between the user and the electronic device 250) is out of the automatic login range of the application, the wearable electronic device 210 may be configured not to transmit user information for login or configured to output a user interface, notifying that the user is out of the automatic login range, through the display 216, a speaker (not shown), or other notification mechanism.

In an embodiment, the wearable electronic device 210 worn by the user may be configured to support automatic login through the electronic device 250. The wearable electronic device 210 may be configured to transmit user information for logging in to the electronic device 250 so as to support the electronic device 250 to execute a user login using the user information.

In an embodiment, the wearable electronic device 210 may be configured to request a user's confirmation to support automatic login through the electronic device 250. For example, the wearable electronic device 210 may be configured to provide information for requesting user confirmation to the user through the display 216 or a speaker (not shown) before transmitting user information to the electronic device 250, and based on the user acceptance, transmit user information to the electronic device 250.

According to some embodiments, the wearable electronic device 210 may be configured to transmit only user information for a login procedure in the electronic device 250, and may communicate with the electronic device 250 through a short-range wireless communication connection without a direct login procedure for an application-related user account (or a user account of the application) in the wearable electronic device 210.

According to some embodiments, the wearable electronic device 210 may be configured to support automatic login in the electronic device 250 by activating and/or authenticating user information prestored on the electronic device 250.

In an embodiment, the electronic device 250 may be configured to execute a login procedure through the electronic device 250 using user information received from the wearable electronic device 210. For example, the login procedure may correspond to a procedure of automatically inputting user information (e.g., one or more of a user ID, a user password, a token, and biometric authentication information) received from the wearable electronic device 210 into a login window that is being displayed on the screen so as to identify and/or authenticate a user.

As the login is executed, the electronic device 250 may connect to, access, or use a user account related to the application. For example, information about a user account related to an application may be stored locally in the memory 254 of the electronic device 250, may be stored in a server (e.g., the server 108 in FIG. 1, an exercise service server, a streaming service server, or a portal service server), which provides a service through the application, or may be stored in the memory 254 of the electronic device 250 and the server in a distributed manner.

After the user's login procedure is completed, the electronic device 250 may display a guide message notifying of successful login of the user or provide a service using the application to the logged-in user.

In an embodiment, the electronic device 250 may transmit information notifying of the user's successful login to the wearable electronic device 210 after the user's login procedure is completed. For example, the wearable electronic device 210 may be configured to provide information indicating successful login received from the electronic device 250 to the user through the display 216 or a speaker (not shown).

In an embodiment, when user information for login is not received within a designated time after transmitting a login response request in operation 310, the electronic device 250 may display an error message indicating a login failure.

According to an embodiment, multi-login for the same user (e.g., the same user account of the same application) may be performed on both sides of the wearable electronic device 210 and the electronic device 250.

For example, the wearable electronic device 210 may be configured to perform a user login based on the location (or user location) of the wearable electronic device 210, which is measured or determined in operation 330, being included in an automatic login range of the application (e.g., an exercise app). For example, the wearable electronic device 210 may transmit user information to the electronic device 250 to support a user login in the electronic device 250, and may activate and/or authenticate the corresponding user information on the wearable electronic device 210 so as to enable multi-login of the same user to be executed through the two electronic devices 210 and 250.

In an embodiment, the wearable electronic device 210 may be configured to perform at least one operation of requesting a logout of the user from the electronic device 250, and executing the user logout in the wearable electronic device 210, based on the location measured or determined through operation 330 being out of the automatic login range of the application (e.g., an exercise app).

In an embodiment, the automatic login range may be identified based on application information. The application information may include at least one of application identification information (e.g., an app ID, an app group ID) and application characteristic information (e.g., information about an application type or attribute).

For example, the automatic login range may be configured differently for each application, for each application characteristic, or based on some other criteria.

For example, a different automatic login range may be configured for each individual app. With regard to a first app executed through a smart TV, an automatic login range corresponding to the viewing distance and/or angle may be configured. With regard to a second app executed through a smart speaker, an automatic login range corresponding to the optimal distance and/or angle for an audio service may be configured.

As another example, different automatic login ranges may be configured for each app group. The exercise app or game app may be classified into a first group having the same characteristic (e.g., the same type value or attribute value) of utilizing a user's motion data and providing services (e.g., an exercise or game service) within a designated distance and/or angle from the front of the electronic device 250. The streaming app or the schedule app may be classified into a second group having the same characteristic (e.g., the same type value or attribute value) in that they provide a designated service (e.g., an audio service). The second group may have a relatively wide serviceable range, and based on this characteristic, the apps in the second group may have a relatively wide automatic login range compared to that of the first group.

As another example, the automatic login range may be configured according to the characteristics of the app. For example, a payment app may have a high level of security required compared to other apps (e.g., an exercise app or a game app). Based on these characteristics, the payment app may have a narrower automatic login scope compared to that of other apps.

Figure 3B:
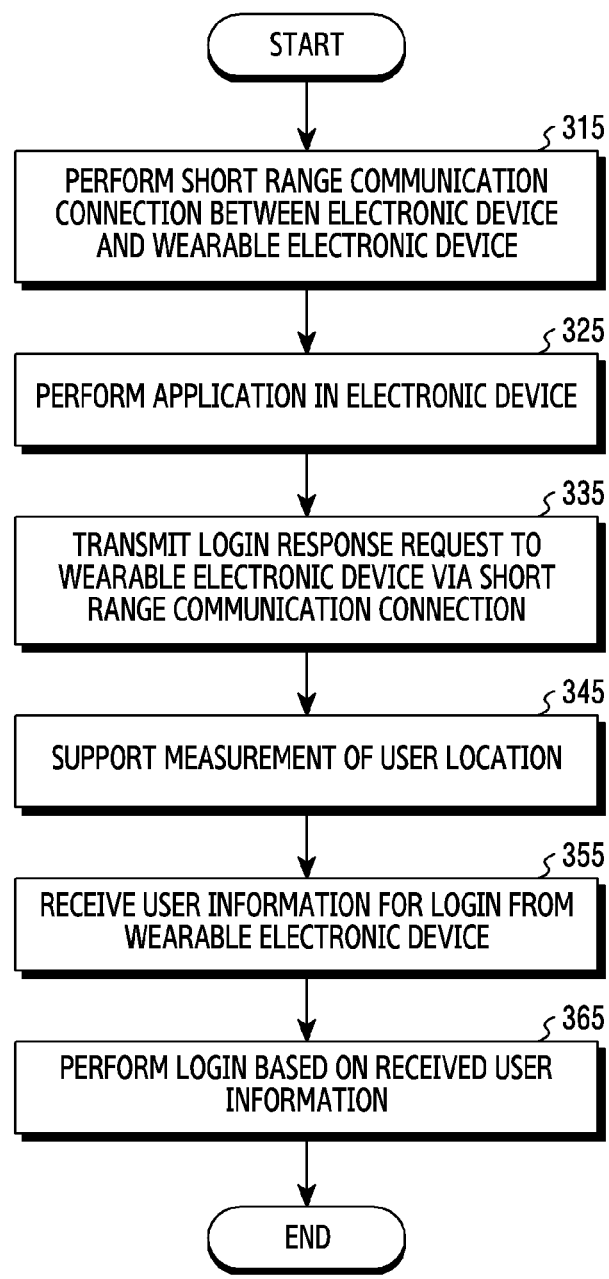
FIG. 3B is a flowchart illustrating a method for operating an electronic device according to an embodiment.

FIG. 3B is a flowchart illustrating a method for operating an electronic device according to an embodiment.

The method of FIG. 3B may be performed by the electronic device 250 (e.g., a smart TV) of FIG. 2. For example, the electronic device 250 may interact with the wearable electronic device 210 of FIG. 3A worn by a user for a location-based automatic login operation. For example, at least a part of the method of FIG. 3B may be performed by the electronic device 250, the processor of the electronic device 250 (e.g., the processor 251 of FIG. 2), a software module (e.g., at least one of a login manager module 1151, a UWB location service module 1153, and a UWB framework module 1155 shown in FIG. 11) having been stored in the memory 254 of the electronic device 250 and executed by the processor 251, or an application (e.g., an exercise app, a schedule app, a game app, a streaming app, a home app, a portal app, or a search app) executed in the electronic device 250. In some embodiments, at least one of the operations of the method illustrated in FIG. 3B may be omitted, the order of some operations may be changed, and/or other operations may be added.

In an embodiment, the electronic device 250 may perform an automatic login operation based on the location of the wearable electronic device 210 worn by the user (or the location of the user) being included in an automatic login range of a designated application (e.g., an exercise app).

Referring to FIG. 3B, the method for operating the electronic device 250 according to an embodiment may include operations 315, 325, 335, 345, 355, and 365.

In operation 315, the electronic device 250 (e.g., a smart TV) may be configured to perform a short-range wireless communication connection (e.g., Bluetooth, BLE, Wi-Fi, or IrDA) with the wearable electronic device 210.

In operation 325, the electronic device 250 may be configured to execute an application (e.g., an exercise app).

For example, when a user wearing the wearable electronic device 210 approaches within a designated distance and/or angle, an operation 315 of connecting a short-range wireless communication and an operation 325 of executing an app may be performed. As another example, when there is a user request or when the same app (e.g., an exercise app) is being executed in the wearable electronic device 210, an operation 315 of connecting the short-range wireless communication and an operation 325 of executing the app may be performed.

In operation 335, the electronic device 250 may transmit a login response request to the wearable electronic device 210 through a short-range wireless communication connection. For example, the login response request may include identification information (e.g., exercise app ID) of an application that is executed by the electronic device 250 and waiting for user login.

In operation 345, the electronic device 250 may support a user location measurement operation of the wearable electronic device 210. For example, the UWB sensor of the electronic device 250 may operate as a tag and perform UWB communication with the UWB sensor of the wearable electronic device 210, which operates as an anchor, so as to support measurement of the location (distance and/or angle) of the wearable electronic device 210 with respect to the electronic device 250.

In operation 355, the electronic device 250 may receive user information (e.g., at least a part of a user ID, a user password, a token, or biometric authentication information) for logging in from the wearable electronic device 210. For example, when the location of the wearable electronic device 210 worn by the user is included in an automatic login range predesignated for an application (e.g., an exercise app), user information for login may be transmitted from the wearable electronic device 210 to the electronic device 250.

In operation 365, the electronic device 250 may be configured to execute a user login to an application (e.g., an exercise app) executed based on user information received from the wearable electronic device 210.

After the user login procedure is completed, the electronic device 250 may output a user interface notifying of the successful login of the user through the display 255 or the speaker (not shown) of the electronic device 250.

In an embodiment, the electronic device 250 may perform an automatic logoff operation based on the location of the wearable electronic device 210 worn by the user (or the location of the user) being out of the automatic login range of a designated application (e.g., exercise app).

Figure 4:
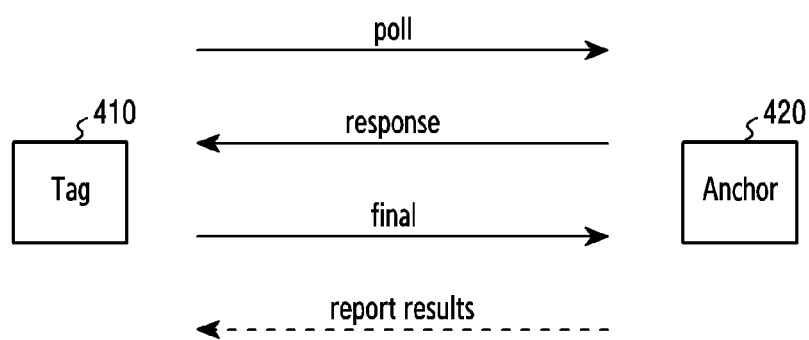
FIG. 4 illustrates an ultra-wideband ("UWB") positioning method applicable to a wearable electronic device according to an embodiment.

FIG. 4 illustrates a UWB positioning method applicable to a wearable electronic device according to an embodiment.

According to an embodiment, a distance between the wearable electronic device 210 and the electronic device 250 may be measured by the UWB positioning method. The wearable electronic device 210 and the electronic device 250 may each include a UWB sensor for UWB positioning.

For example, the electronic device 250 (e.g., a smart TV) may be a reference device placed in a fixed location. The wearable electronic device 210 may be a mobile device with a variable location. One side UWB sensor included in the electronic device 250 may operate as an anchor 420 (e.g., Anchor), and the other side UWB sensor included in the wearable electronic device 210 may operate as a tag 410 (e.g., Tag). In other configurations, the wearable electronic device 210 may operate as the anchor 420, and the electronic device 250 may operate as the tag 410.

In the UWB positioning method, a distance between the anchor 420 and the tag 410 may be measured based on a time of flight (ToF), which is information about a time taken when radio waves travel the distance between the tag 410 and the anchor 420.

The tag 410 may periodically send a polling radio wave (poll) to the anchor 420, and the anchor 420 may respond after receiving the polling radio wave. When the tag 410 transmits a final signal to the anchor 420 again, the anchor 420 may (optionally) return report results.

By subtracting a time period (Tpoll) until the tag 410 receives a response after sending a polling radio wave (poll) and a time period (Treply) until the anchor 420 responds to a polling radio wave (poll) after receiving the same, a ToF value corresponding to the two time periods may be obtained. By dividing sum of the time periods by two, the ToF may be calculated. Thus, the distance between the tag 410 and the anchor 420 may be determined.

In some embodiments, the distance and the angle between the wearable electronic device 210 and the electronic device 250 may be measured together by the UWB positioning method. For example, when two or more antennas are mounted on the wearable electronic device 210 or the electronic device 250, the angle of the counterpart device may be known by using a phase difference of the signal entering each antenna. Such positional measurement is referred to as angle of arrival (AOA).

When the UWB positioning method is applied, the positioning accuracy for the user's location, which is a condition for automatic login, may be improved, and the automatic login range for each application may be precisely controlled.

In the UWB positioning method, the positioning accuracy may satisfy ±10 cm from the line of sight. The angle may have a resolution of 5° (or ±5° relative to a determined angle).

Figure 5:
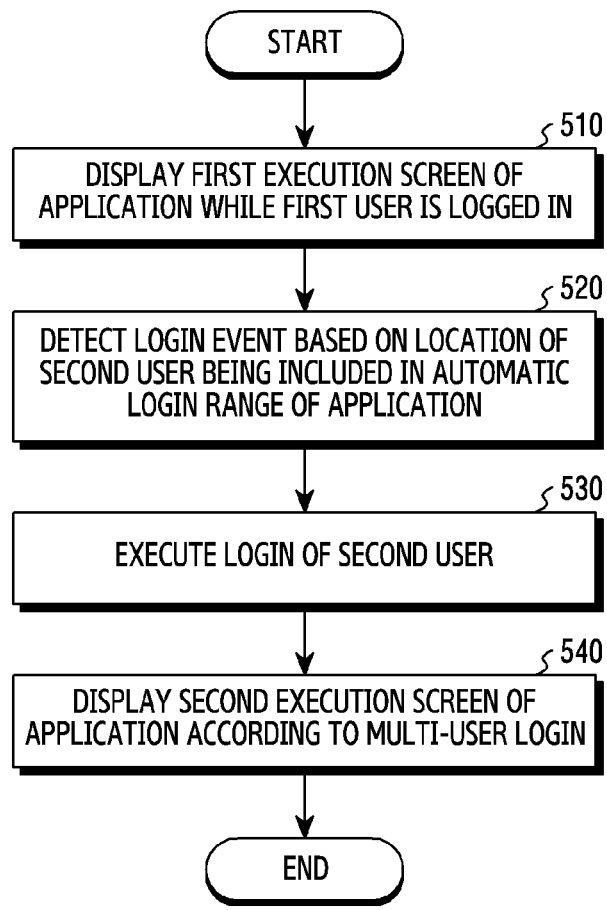
FIG. 5 is a flowchart illustrating a method for operating an electronic device according to an embodiment.

FIG. 5 is a flowchart illustrating a method for operating an electronic device according to an embodiment.

The method of FIG. 5 may be performed by the electronic device 250 of FIG. 2 (e.g., a smart TV, a smart speaker, or a smart refrigerator). For example, at least a part of the method of FIG. 5 may be performed by the electronic device 250, the processor 215 of the electronic device 250, a software module (e.g., at least one of a login manager module 1151, a UWB location service module 1153, and a UWB framework module 1155 shown in FIG. 11) having been stored in the memory 254 of the electronic device 250 and executed by the processor 251, or an application (e.g., an exercise app, a schedule app, a game app, a streaming app, a home app, a portal app, or a search app) executed in the wearable electronic device 210. In some embodiments, at least one of the operations of the method illustrated in FIG. 5 may be omitted, the order of some operations may be changed, and/or other operations may be added.

Referring to FIG. 5, the method for operating the electronic device 250 according to an embodiment may include operations 510, 520, 530, and 540.

In operation 510, the electronic device 250 may display a first execution screen of the application (e.g., the first screen 910 shown in FIG. 9A) through the display 255 while a first user (e.g., user A) wearing a first wearable electronic device (e.g., a first wearable electronic device 210_1 shown in FIG. 9A) is logged in to a first account of an application (e.g., exercise app). The first account may be an account of a first user related to an application (e.g., an exercise app).

In operation 520, the electronic device 250 may determine whether the distance and/or angle between a second user (e.g., user B) wearing a second wearable electronic device (e.g., a second wearable electronic device 210_2 shown in FIG. 9B) and the electronic device 250 falls within automatic login range for an application (e.g., an exercise app).

When the distance and/or angle between the second user and the electronic device 250 is included in an automatic login range for an application (e.g., an exercise app), the electronic device may be configured to determine that a login event of the second user has occurred. When the distance and/or angle between the second user and the electronic device 250 is not included in the automatic login range for the application (e.g., exercise app), the electronic device may determine that the login event of the second user does not occur.

In an embodiment, an automatic login range for an application (e.g., an exercise app) may be prestored in the electronic device 250 or the second wearable electronic device 210_2.

When it is determined that the login event of the second user has occurred, the electronic device 250 may proceed to operation 530.

In operation 530, the electronic device 250 may be configured to execute the second user's login to a second account of an application (e.g., an exercise app). The second account may be an account of a second user related to the application (e.g., an exercise app).

In operation 540, the electronic device 250 may display a second execution screen (e.g., a second screen 920 shown in FIG. 9B or the third screen 930 shown in FIG. 9C) of the application (e.g., an exercise app) through the display 255, according to execution of multi-user login including the first user and the second user. Thereafter, the electronic device 250 may provide a service (e.g., exercise service) through an application (e.g., exercise app) to the first user and the second user in a state of being simultaneously logged in.

Figure 6A:
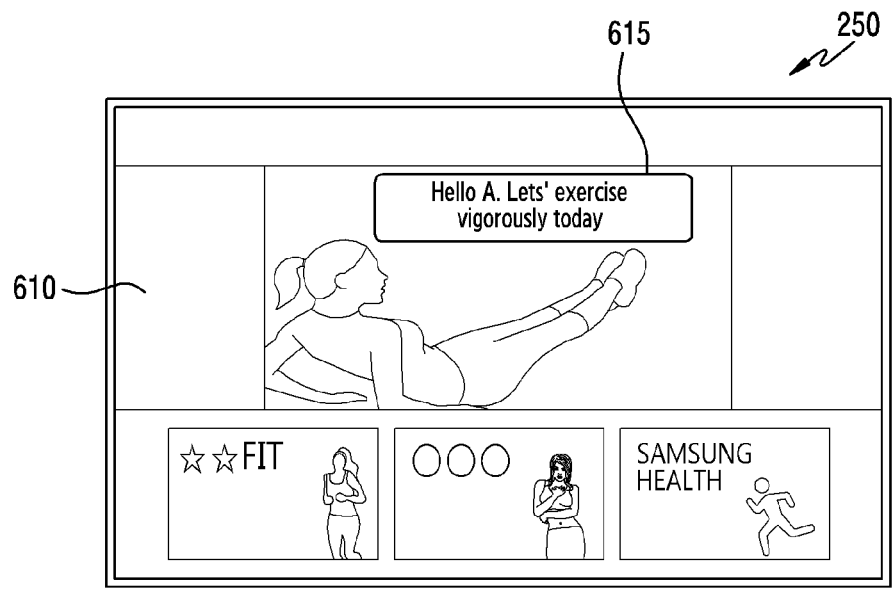
FIGS. 6A and 6B are examples of a user interface related to automatic login using a wearable electronic device and an electronic device according to an embodiment.
Figure 6A:
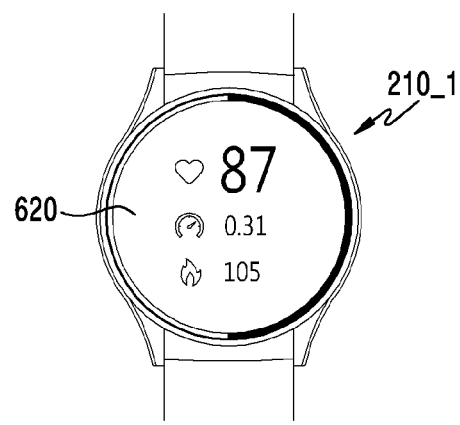
Figure 6B:
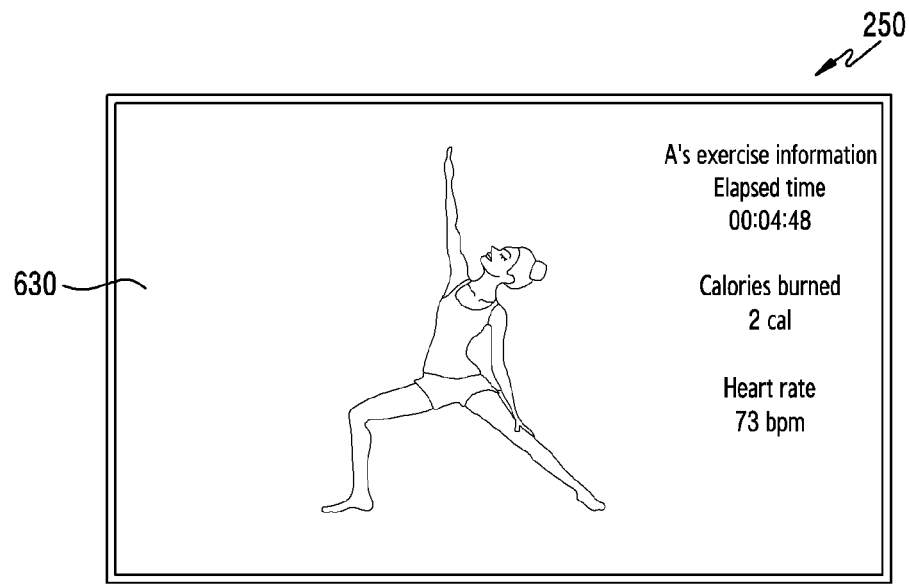
Figure 6B:
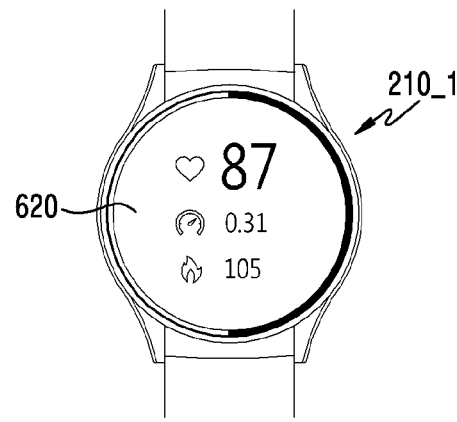

FIGS. 6A and 6B are examples of a wearable electronic device and a user interface related to automatic login using the electronic device according to an embodiment.

The user interfaces of FIGS. 6A and 6B may be related to an automatic login procedure of user A wearing a first wearable electronic device 210_1 (e.g., a first smart watch). The first wearable electronic device 210_1 (e.g., a first smart watch) and the electronic device 250 (e.g., a smart TV) may interact for automatic login of user A.

For example, user A may be wearing the first wearable electronic device 210_1 (e.g., a first smart watch). The user A may be located in a place where the electronic device 250 is placed (e.g., indoors or in a living room in the house).

When the user A runs an exercise app on the electronic device 250 after turning on the electronic device 250 (e.g., a smart TV), the electronic device 250 may recognize the first wearable electronic device 210_1 which is located within the coverage of short-range wireless communication (e.g., BLE or Wi-Fi) so as to establish a short-range wireless communication connection with the first wearable electronic device 210_1 (e.g., Bluetooth pairing or Wi-Fi connection).

The electronic device 250 may transmit the app ID of the running exercise app to the first wearable electronic device 210_1 through a short-range wireless communication connection. The first wearable electronic device 210_1 may identify an automatic login range corresponding to the received App ID from previously stored location-based login information.

For example, the first wearable electronic device 210_1 may measure a location of the user A (e.g., the distance and/or angle between the user A and the electronic device 250) through the UWB sensor, and may extract the automatic login range for the received app ID (or app group ID, app type value, or attribute value) from the previously stored location-based login information.

When the user A's location (e.g., the distance and/or angle between the user A and the electronic device 250) is within the extracted automatic login range, the first wearable electronic device 210_1 may be configured to transmit user information of the user A (e.g., a user ID, a user password, a token, and/or biometric authentication information) to the electronic device 250 and thus support a user login procedure in the electronic device 250. The electronic device 250 may perform a user login procedure for the running of an exercise app by using the transmitted user information.

As the automatic login procedure of user A is completed, the electronic device 250 may display a user interface notifying of the user A's successful login. For example, as shown in FIG. 6A, the electronic device 250 may display a message window 615 indicating the user A's login and/or service start on the first screen 610, which is the execution screen of the exercise app.

After the user A's login, the first wearable electronic device 210_1 may measure motion data or biometric data (e.g., heart rate, blood pressure, body temperature, or calories burned) of the user A for an exercise service and transfer the measured motion data or biometric data to the electronic device 250 via short-range wireless communication. The first wearable electronic device 210_1 may display a second screen 620 indicating a measurement result of the user A's motion data or biometric data.

The electronic device 250 may receive, store, or process the user A's motion data or biometric data to provide an exercise service using an exercise app. For example, as shown in FIG. 6B, the electronic device 250 may display a third screen 630 indicating exercise information (e.g., exercise status information or exercise evaluation information) based on the motion data or biometric data received from the first wearable electronic device 210_1.

Figure 7:
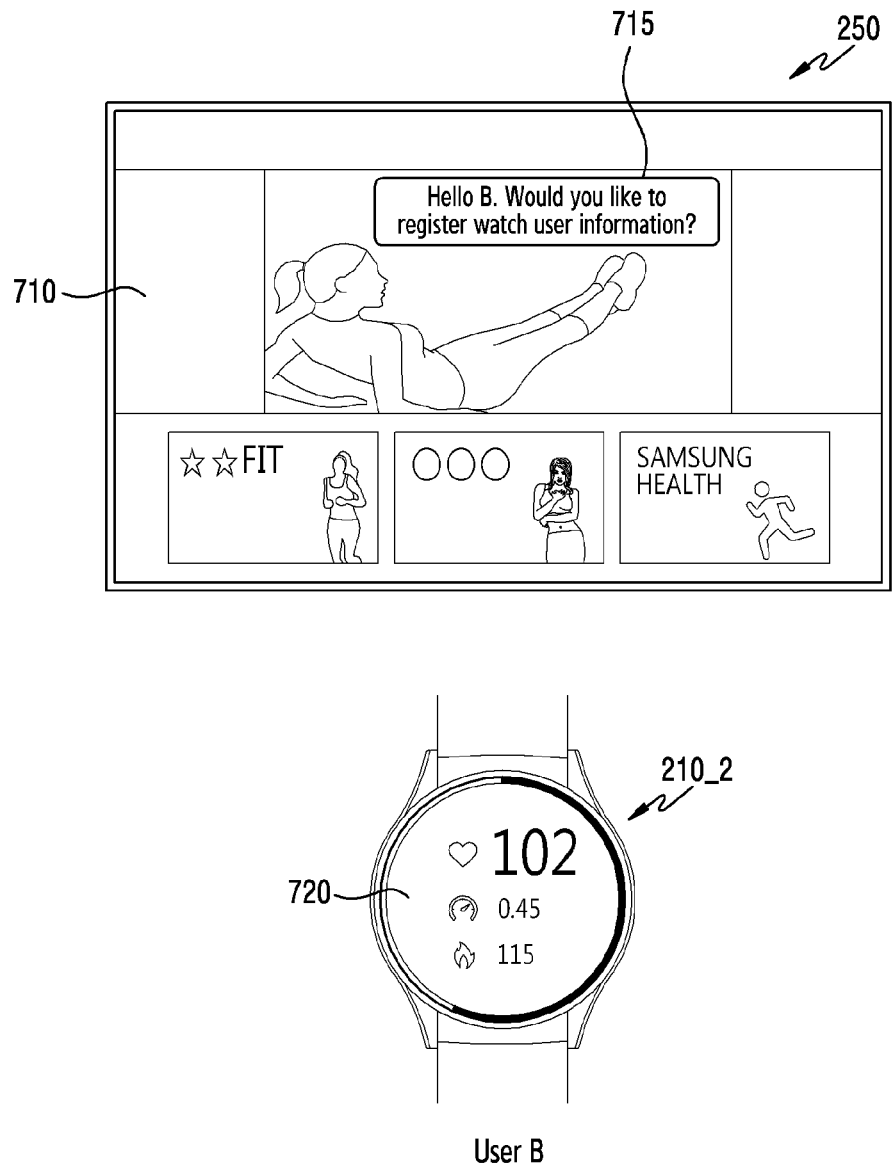
FIG. 7 is another example of a user interface related to automatic login using a wearable electronic device and an electronic device according to an embodiment.

FIG. 7 is another example of a user interface related to automatic login using a wearable electronic device and an electronic device according to an embodiment. The user interface of FIG. 7 may be related to a registration procedure of user B wearing a second wearable electronic device 210_2 (e.g., a second smart watch).

For example, the second wearable electronic device 210_2 (e.g., the second smart watch) having an exercise app installed therein may be in a state in which user information for the user B's login is registered (or have a login history). However, the electronic device 250 (e.g., a smart TV) having the same exercise app installed therein may be in a state in which user information for the user B's login is unregistered (or there is no login history).

In this case, the electronic device 250 may display a user interface for the registration procedure. For example, the electronic device 250 may display a message window 715 for inducing registration of user B or inquiring about the intention to register on the first screen 710 which is the execution screen of the exercise app.

For the registration of user B, the second wearable electronic device 210_2 may provide the user B's user information (e.g., a name, an ID, a user password, a token, and/or biometric authentication information) to the electronic device 250.

The second wearable electronic device 210_2 worn by the user B may provide corresponding user information based on the user B's location (e.g., the distance and/or angle between the user B and the electronic device 250) being included in the automatic login range for the exercise app. The electronic device 250 may be configured to execute a registration procedure for the user B using the user information received from the second wearable electronic device 210_2.

Thereafter, when the user B approaches the electronic device 250 and comes within the automatic login range of the exercise app, an automatic login procedure is executed so that the user B may use the exercise app through the electronic device 250.

After the user B's login, the second wearable electronic device 210_2 may measure the user B's motion data and/or biometric data (e.g., heart rate, blood pressure, body temperature, or calories burned) for an exercise service and transfer the measured data to the electronic device 250 via short-range wireless communication. The second wearable electronic device 210_2 may display a second screen 720 indicating a measurement result of the user B's motion data and/or biometric data.

Figure 8:
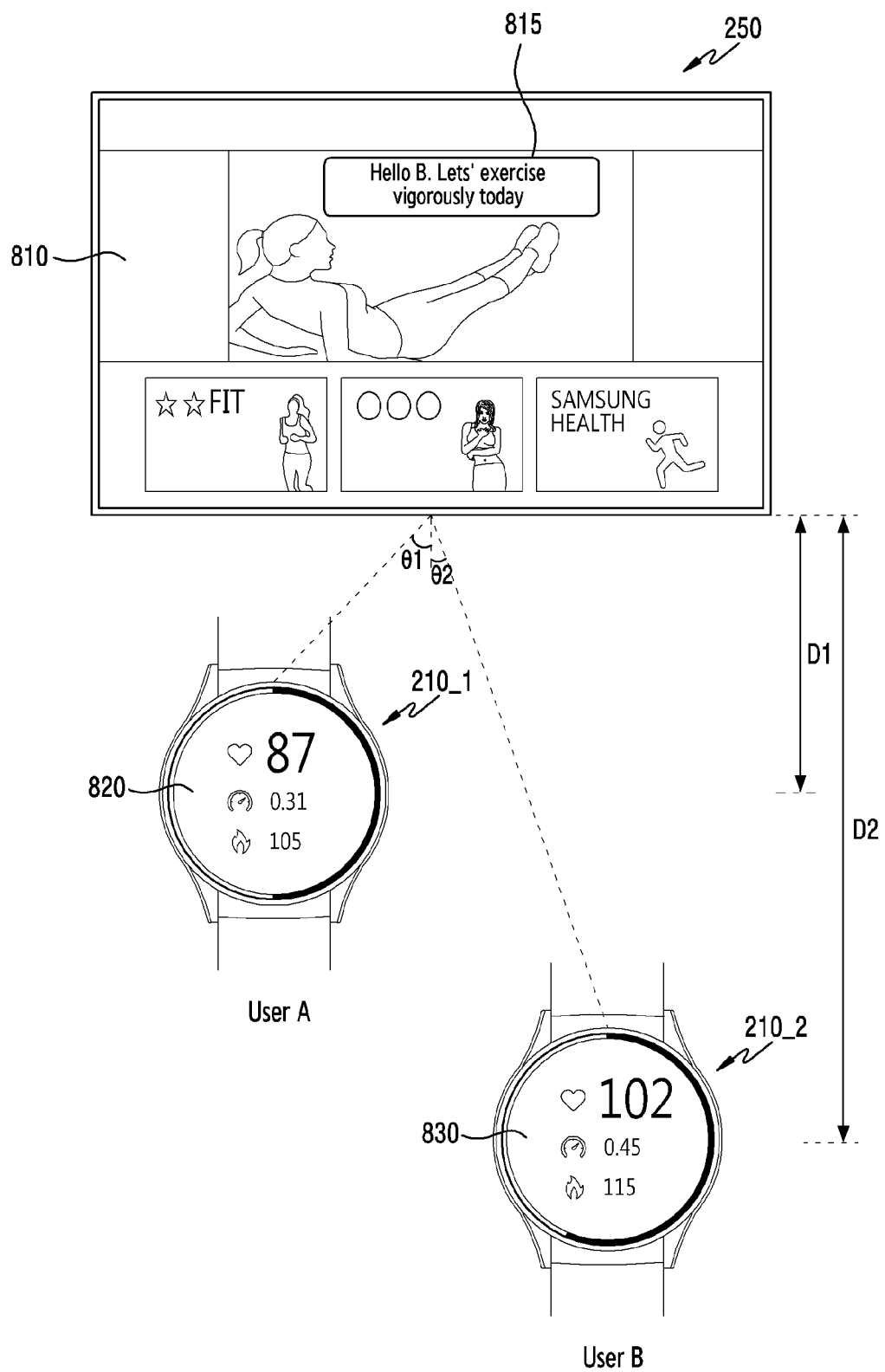
FIG. 8 is an example of a user interface related to automatic multi-user login using a wearable electronic device and an electronic device according to an embodiment.

FIG. 8 is an example of a user interface related to automatic multi-user login using a wearable electronic device and an electronic device according to an embodiment. The user interface of FIG. 8 may be related to an automatic multi-user login procedure of users A and B.

According to an embodiment, the automatic login range for the same app may be configured differently for each user or for each device.

In an embodiment, the electronic device 250 may detect, based on user information (e.g., user ID) or device information (e.g., device ID), whether the corresponding user or the corresponding device enters within the automatic login range of a designated application and/or is out of the automatic login range.

For example, the automatic login range of user A (or the first wearable electronic device 210_1 worn by user A) for the exercise app may correspond to the first location (first distance D1 and first angle θ1), and the user B's automatic login range for the exercise app (or the second wearable electronic device 210_2 worn by the user B) may correspond to the second location (second distance D2 and second angle θ2). For example, the first distance D1 and the first angle θ1 may be designated as the automatic login range corresponding to the user A (or the first wearable electronic device 210_1) and the exercise app. The second distance D2 and the second angle θ2 may be designated as the automatic login range corresponding to the user B (or the second wearable electronic device 210_2) and the exercise app.

If user B prefers to exercise at the second distance D2 that is greater than the first distance D1, which in some configurations may be a default value, the user B may reconfigure the second distance D2 as the automatic login range to lower the sensitivity. For example, the automatic login range may be set or customized by the user. With regard to the user A who has not performed any such reconfiguration, the automatic login range of the exercise app may be maintained at the first distance D1, which is a default value.

When the user A wearing the first wearable electronic device 210_1 enters a space or area defined by the first distance D1 and the first angle θ1, an automatic login procedure for the user A may be executed. The user A may automatically log in to the exercise app of the electronic device 250 and use the exercise app.

When the user A logs in, motion data or biometric data of the user A may be measured through the first wearable electronic device 210_1 and provided to the electronic device 250. A second screen 820 indicating a measurement result of the data may be displayed on the first wearable electronic device 210_1.

In addition, when the user B wearing the second wearable electronic device 210_2 enters a space or area defined by the second distance D2 and the second angle θ2, an automatic login procedure for the user B may be executed. The user B may automatically log in to the exercise app of the electronic device 250 and use the exercise app. As the automatic login procedure is executed, the electronic device 250 may display a user interface notifying of successful (or complete) login of user B. For example, the electronic device 250 may display a message window 815 indicating the user B's login on the first screen 810 that is the execution screen of the exercise app.

When the user B logs in, motion data or biometric data of the user B may be measured through the second wearable electronic device 210_2 and provided to the electronic device 250. A third screen 830 indicating a measurement result of the data may be displayed on the second wearable electronic device 210_2.

Figure 9A:
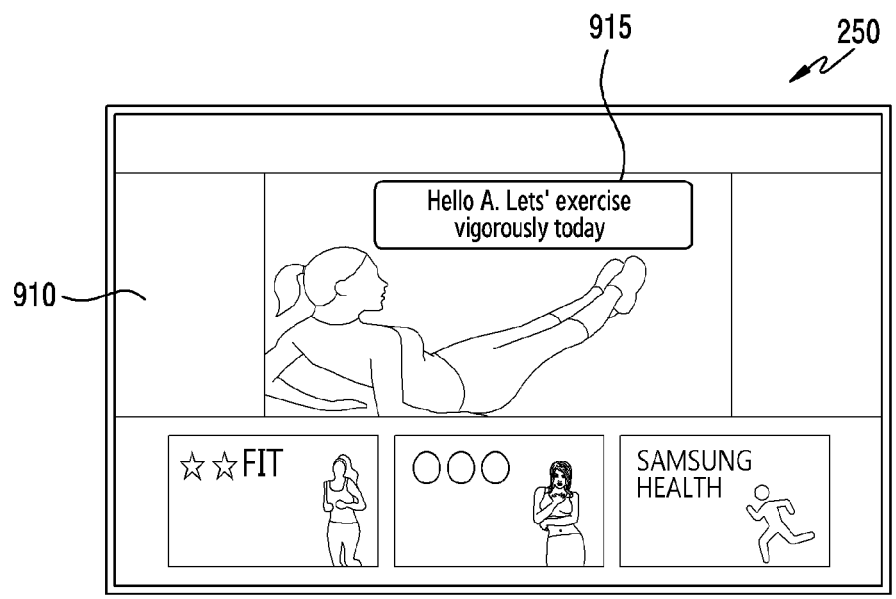
FIGS. 9A, 9B, and 9C are other examples of a user interface related to automatic multi-user login using a wearable electronic device and an electronic device according to an embodiment.
Figure 9A:
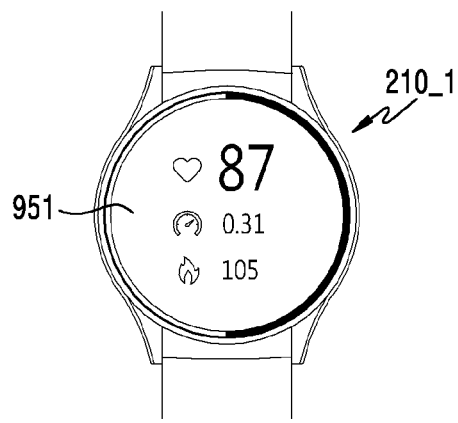
Figure 9B:
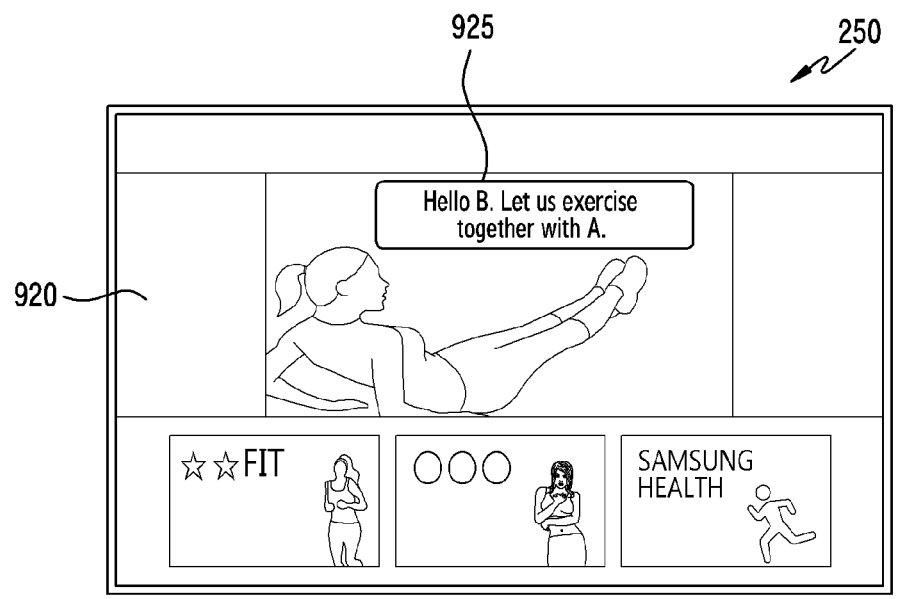
Figure 9B:
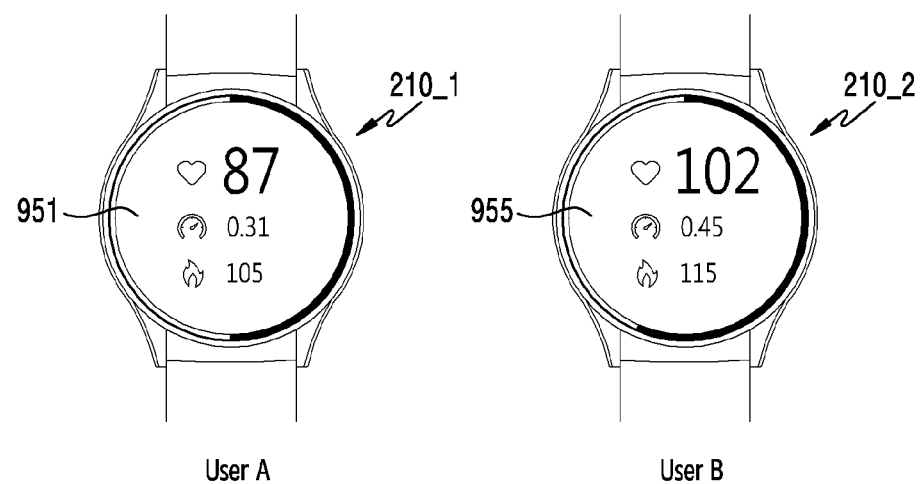
Figure 9C:
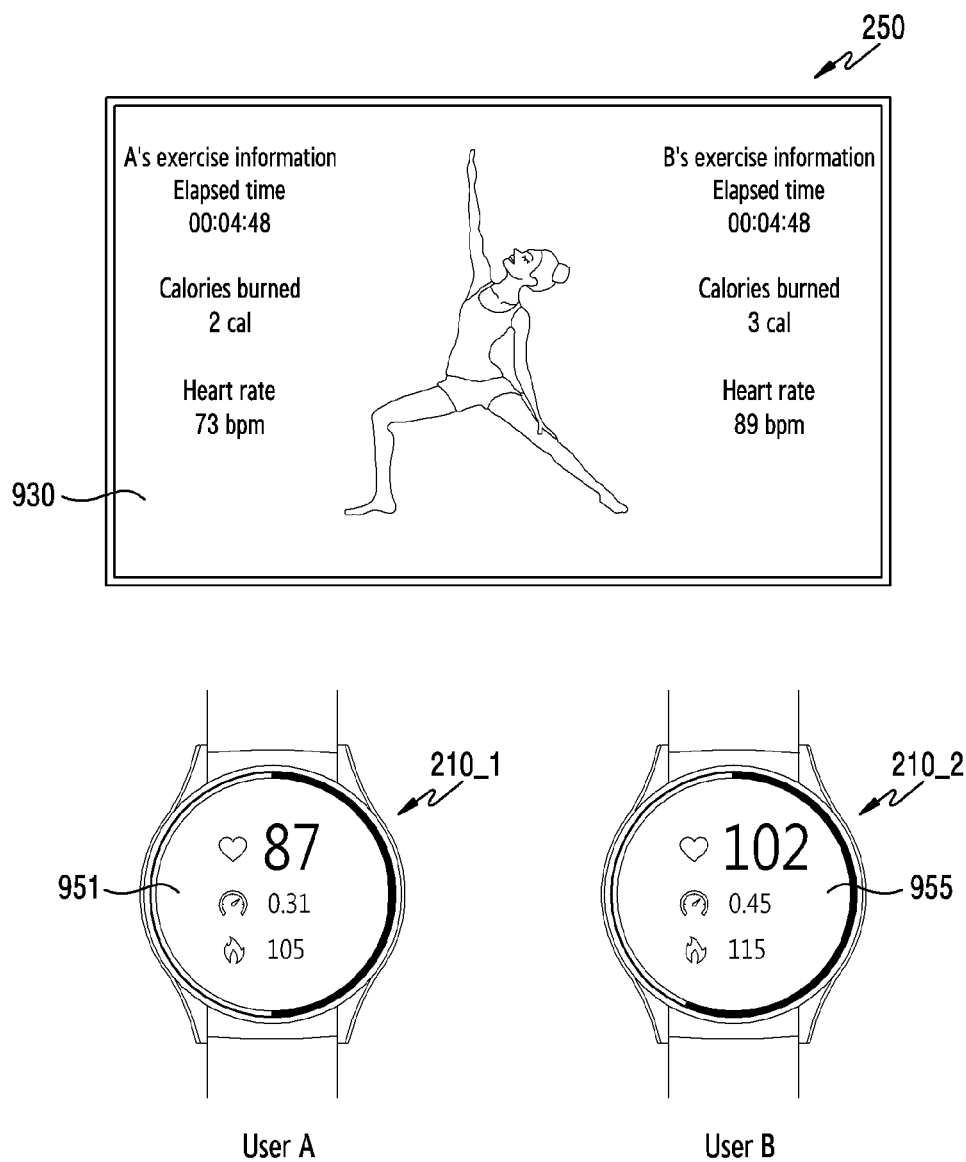

FIGS. 9A, 9B, and 9C are other examples of a user interface related to automatic multi-user login using a wearable electronic device and an electronic device according to an embodiment. The user interfaces of FIGS. 9A, 9B, and 9C may correspond to automatic login procedures of users A and B.

For example, the electronic device 250 (e.g., a smart TV) may provide a multi-user simultaneous access function through an exercise app.

For example, a user A (a first user) and a user B (a second user) are a family member and may be located within a predetermined indoor range (e.g., a living room). The user A may be wearing the first wearable electronic device 210_1 (e.g., a smart watch). The user B may be wearing the second wearable electronic device 210_2 (e.g., a smart watch).

When the user A and user B are together in the same place (e.g., a living room), the electronic device 250 may perform interaction (e.g., perform automatic login action) with the user A's first wearable device 210_1 (e.g., a smart watch) and the user B's second wearable device 210_2 (e.g. a smart watch). The electronic device 250 may recognize that the user A and the user B are within a predetermined range through the interaction, and perform an automatic login procedure for the user A and the user B. The first wearable device 210_1 and the second wearable device 210_2 may support an automatic login procedure for the exercise app of users A and B through interaction with the electronic device 250.

For example, when a user A wearing the first wearable device 210_1 comes within a first distance and/or a first angle (or a space/area defined by the first distance and the first angle), which is a designated automatic login range for the exercise app, an automatic login procedure for the user A may be executed. The user A may automatically log in to the exercise app of the electronic device 250 and use the exercise app. As the automatic login procedure is executed, the electronic device 250 may display a user interface notifying of successful (or complete) login of the user A.

For example, as shown in FIG. 9A, the electronic device 250 may display a message window 915 indicating the user A's login on the first screen 910, which is the execution screen of the exercise app. When the user A logs in, motion data and/or biometric data of the user A may be measured through the first wearable electronic device 210_1 and may be provided to the electronic device 250 from the first wearable electronic device 210_1. At the same time, a first screen 951 indicating a corresponding measurement result may be displayed on the first wearable electronic device 210_1.

Thereafter, when the user B wearing the second wearable electronic device 210_2 comes within the first distance and/or the first angle (or a space/area defined by the first distance and the first angle), an automatic login procedure for the user B may be performed. In a state where short-range wireless communication connection with the first wearable electronic device 210_1 worn by the user A and the user A's login are maintained, the electronic device 250 may detect the approach of the second wearable electronic device 210_2 worn by the user B so as to establish a short-range wireless communication connection with the second wearable electronic device 210_2, and may perform an automatic login procedure of the user B. The user B may automatically log in to the exercise app of the electronic device 250 and participate in an exercise program provided by the exercise app together with the user A. As the automatic log-in procedure is executed, the electronic device 250 may display a user interface notifying of the user B's log-in.

For example, as shown in FIG. 9B, the electronic device 250 may display a message window 925 indicating the presence of the previously logged in user A and the participation of the user B on the second screen 920, which is the execution screen of the exercise app. When user B logs in, motion data and/or biometric data of the user B may be measured through the second wearable electronic device 210_2 and provided to the electronic device 250. At the same time, a second screen 955 indicating a measurement result of the data may be displayed on the second wearable electronic device 210_2.

The electronic device 250 may provide an exercise service using the exercise app by receiving, storing, or processing the motion data or biometric data of the users A and B simultaneously logged in to the exercise app.

For example, as shown in FIG. 9C, the electronic device 250 may display a third screen 930 indicating exercise information (e.g., exercise status information or exercise evaluation information) based on the motion data and/or biometric data received from the first wearable electronic device 210_1 of the user A and the second wearable electronic device 210_2 of the user B.

In addition, when a user C wearing a third wearable electronic device (not shown) arrives nearby and enters within the first distance and/or first angle (or a space/area defined by the first distance and the first angle), the electronic device 250 may recognize the user C and execute an automatic login procedure for the user C to provide an exercise service so that the user C also participates in the exercise program together with the user A and the user B. It will be appreciated that additional (e.g., more than three) users and user devices (e.g., wearable electronic devices) may simultaneously be connected to the electronic device 250.

In a state where the user A, the user B, and the user C are simultaneously logged in to the exercise app running on the electronic device 250, the electronic device 250 may continuously (or periodically) track the locations of concurrently logged in users and provide a user interface of the exercise app by using the user-specific location.

For example, the electronic device 250 may display a user interface screen in which the respective user's location and exercise information are matched. When each user's location changes, the location change may be reflected on the user interface screen being displayed. When the UWB sensor is used to detect the user's location, positioning accuracy is improved, so that the quality of the service provided through the application may be improved.

FIG. 10 is an example of location-based login information according to an embodiment.

Referring to FIG. 10, location-based login information such as reference numeral 1010 may be prestored for location-based automatic login. For example, the location-based login information may be stored in a memory 215 of the wearable electronic device 210 (e.g., a smart watch), a memory 254 of the electronic device 250 (e.g., a smart TV or a smart speaker), a server (e.g., the server 108 of FIG. 1, a home server, or an application service server), or a combination thereof.

According to an embodiment, the location-based login information may include information on an automatic login range (e.g., 100 cm or 200 cm) for each application (or for each application characteristic). Location-based login information may include information about at least a part of a device ID (e.g., Device 1 or Device 2), an app ID (e.g., AAA or BBB), a user ID (e.g., aaa or aab), and a user password.

As an example, as illustrated, the automatic login range of the first app (e.g., AAA) may be designated as 100 cm, and the automatic login range of the second app (e.g., BBB) may be designated as 200 cm.

As another example, although not shown, the automatic login range for the first app (e.g., AAA) and the first user (e.g., aaa) may be designated as 100 cm, and the automatic login range for the second app (e.g., BBB) and the second user (e.g., aaa) may be designated as 200 cm.

In an embodiment, when multiple users use the same app (e.g., AAA) installed in one electronic device 250, a user ID of each of the multiple users may be registered. When the electronic device 250 supports multiple apps having different App IDs, an App ID for each of the multiple apps may be registered. Other information (e.g., an app type value, an app attribute value, an app group ID, or an automatic login angle) may be further added to the location-based login information.

Figure 11:
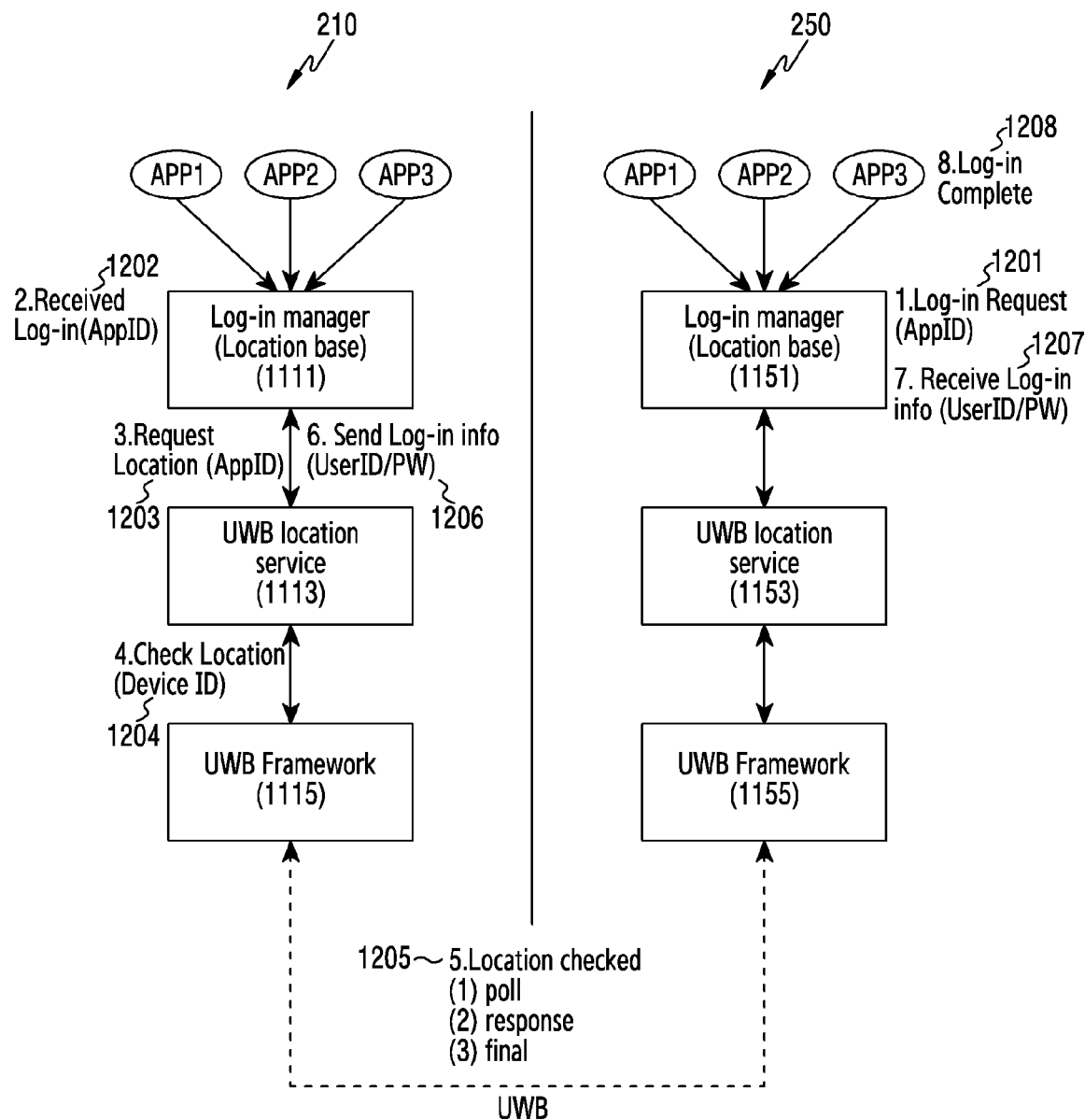
FIG. 11 is an example of a location-based automatic login method using a wearable electronic device and an electronic device according to an embodiment.

FIG. 11 is an example of a location-based automatic login method using a wearable electronic device and an electronic device according to an embodiment.

In an embodiment, the wearable electronic device 210 (e.g., a smart watch) and the electronic device 250 (e.g., a smart TV) may measure a counterparty's location or its own location, for example, a distance and/or angle therebetween using the UWB method, and may support and/or execute a distance-based automatic login procedure using the measured distance and/or angle.

For the location-based automatic login procedure, the wearable electronic device 210 may register location-based login information. For example, the location-based login information may include identification information for at least one application and information on an automatic login range for each application (or for each characteristic of each application).

In an embodiment, the wearable electronic device 210 may have a hierarchical structure including one or more applications (e.g., APP1, APP2, or APP3), a login manager module 1111, a UWB location service module 1113, and a UWB framework module 1115. Each element may be implemented as hardware, firmware, and/or software and may be stored in the memory 215 of the wearable electronic device 210. For example, the processor 211 of the wearable electronic device 210 may be configured to execute instructions stored in the memory 215 to operate each element. Alternatively, each element may operate as the instructions stored in the memory 215 are executed. However, the illustrated structure and the UWB positioning method are merely examples for helping understanding of the disclosure, and the scope of the embodiments is not limited thereto.

The login manager module 1111 may be configured to manage (e.g., store, transfer, add, delete, or update) location-based login information. For example, the location-based login information may include an app ID (AppID) which is app identification information, a user ID (userID) and a user password (UserPW) which are user identification information, and automatic login range information (Range).

The UWB location service module 1113 may be to determine whether the counterpart electronic device 250 is within a designated automatic login range. Whether the counterpart electronic device 250 is within a specified automatic login range may be a condition for supporting and/or executing an automatic login procedure. The UWB location service module 1113 may determine whether to provide user information (e.g., UserID or UserPW) required for login according to the determination result.

The UWB framework module 1115 may be to measure a distance and/or an angle between the two electronic devices 210 and 250 via UWB.

In an embodiment, the electronic device 250 may have a hierarchical structure including one or more applications (e.g., APP1, APP2, or APP3), a login manager module 1151, a UWB location service module 1153, and a UWB framework module 1155. The applications (e.g., APP1, APP2, or APP3), the login manager module 1151, the UWB location service module 1153, and the UWB framework module 1155 in the electronic device 250 may correspond to the applications (e.g., APP1, APP2, or APP3), the login manager module 1111, the UWB location service module 1113, and the UWB framework module 1115 in the wearable electronic device 210, respectively.

According to an embodiment, the location-based automatic login procedure may include operations 1201, 1202, 1203, 1204, 1205, 1206, 1207, and 1208.

In operation 1201, the login manager module 1151 of the electronic device 250 (e.g., a smart TV) may transmit a login response request (Log-in Request) to the wearable electronic device 210 through the communication circuit 252 via short-distance communication. The login response request (Log-in Request) may include an app ID (AppID).

In operation 1202, the login manager module 1111 of the wearable electronic device 210 may receive the login response request (Log-in Request) including the app ID (AppID) of an application to log in (e.g., an exercise app) from the electronic device 250 through the communication circuit 252 via short-distance communication. The login response request (Log-in Request) may further include a device ID (DeviceID) of the electronic device 250.

In operation 1203, the login manager module 1111 of the wearable electronic device 210 may identify the automatic login range for the app ID (AppID) within the login response request (Log-in Request). For example, the login manager module 1111 may extract an automatic login range matched with the AppID (or an app group ID (AppGroupID) to which the AppID belongs) from the prestored location-based login information.

A positioning request (Request Location) requesting to measure the distance and/or angle with the counterpart electronic device 250 may be transmitted to the UWB location service module 1113 of a lower layer. The positioning request (Request Location) may include an app ID (AppID).

In operation 1204, the UWB location service module 1113 having received the positioning request (Request Location) may transmit a request (Check Location) for checking the location of the counterpart electronic device 250 to the UWB framework module 1115 of the lower layer. The location check request (Check Location) may include a device ID (DeviceID) of the counterpart electronic device 250. For example, the UWB location service module 1113 may identify the device ID (DeviceID) of the counterpart electronic device 250 within a login response request (Log-in Request) or the device ID of the counterpart electronic device 250 which is currently being connected via short-range wireless communication. The UWB location service module 1113 may transmit a location check request (Check Location) for a corresponding device ID (DeviceID) to the UWB framework module 1115.

In operation 1205, the UWB framework module 1115 may communicate with the UWB framework module 1155 of the counterpart electronic device 250 via UWB to measure a distance and/or an angle between the two electronic devices 210 and 250. The UWB framework module 1115 may feedback the measured distance and/or angle to the UWB location service module 1113 in response to the location check request (Check Location).

In operation 1206, the UWB location service module 1113 may compare the distance and/or angle measured in operation 1205 with the automatic login range for the AppID identified in operation 1203. As a result of the comparison, when the measured distance and/or angle is included in the automatic login range for the app ID (AppID), the UWB location service module 1113 may transfer user information for login (Log-in info, e.g., UserID/PW) to the login manager module 1111.

The login manager module 1111 may transfer the transferred user ID/password (UserID/PW) to the login manager module 1151 of the counterpart electronic device 250.

In operation 1207, the login manager module 1151 of the counterpart electronic device 250 may receive user information (Log-in info, e.g., UserID/PW) from the wearable electronic device 210.

In operation 1208, the login manager module 1151 of the counterpart electronic device 250 may execute user login for the application (e.g., exercise app) using the user information (Login info, e.g., UserID/PW) received from the wearable electronic device 210.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A wearable electronic device (e.g., the wearable electronic device 210 of FIG. 2) according to various embodiments may include a communication circuit (e.g., the communication circuit 212 of FIG. 2) for short-range wireless communication, a positioning sensor (e.g., the positioning sensor 213 of FIG. 2), and at least one processor (e.g., the processor 211 of FIG. 2) operatively connected to the communication circuit and the positioning sensor. The at least one processor may be configured to receive identification information of an application from an external electronic device via the short-range wireless communication, identify an automatic login range of the application based on the identification information of the application and pre-stored location-based login information, measure a location of the wearable electronic device with respect to the external electronic device through the positioning sensor, and transmit user information for a user's login to the external electronic device, based on the measured location being included in the automatic login range.

According to various embodiments, the positioning sensor may include an ultra-wideband (UWB) sensor.

According to various embodiments, the automatic login range may be identified based on at least one of identification information of the application and characteristic information of the application.

According to various embodiments, the at least one processor may be further configured to execute the user's login through the wearable electronic device, based on the measured location being included in the automatic login range.

According to various embodiments, the at least one processor may be further configured to, based on the measured location being out of the automatic login range, request logout of the user from the external electronic device or execute logout of the user through the wearable electronic device.

According to various embodiments, the measured location may include at least one of a distance between the wearable electronic device and the external electronic device and an angle between the wearable electronic device and the external electronic device.

According to various embodiments, the at least one processor may be configured to transmit an account registration request including the user information in case that the user's account for the application is unregistered.

According to various embodiments, the wearable electronic device may further include at least one of a motion sensor and a biosensor. The at least one processor may be configured to transmit information measured through at least one of the motion sensor and the biosensor to the external electronic device via the short-range wireless communication.

According to various embodiments, the at least one processor may be configured to use a fixed default value as the automatic login range in case that the location-based login information does not include an automatic login range corresponding to the identification information.

A method for operating a wearable electronic device according to various embodiments may include: receiving identification information of an application from an external electronic device via short-range wireless communication; identifying an automatic login range of the application based on the identification information of the application and pre-stored location-based login information; measuring a location of the wearable electronic device with respect to the external electronic device through a positioning sensor of the wearable electronic device; and transmitting user information for a user's login to the external electronic device, based on the measured location being included in the automatic login range.

According to various embodiments, the positioning sensor of the wearable electronic device may include an ultra-wideband (UWB) sensor.

According to various embodiments, the automatic login range may be identified based on identification information of the application and characteristic information of the application.

According to various embodiments, the method may further include executing the user's login through the wearable electronic device, based on the measured location being included in the automatic login range.

According to various embodiments, the method may further include requesting logout of the user from the external electronic device or executing logout of the user through the wearable electronic device, based on the measured location being out of the automatic login range.

According to various embodiments, the measured location may include at least one of a distance between the wearable electronic device and the external electronic device and an angle between the wearable electronic device and the external electronic device.

According to various embodiments, the method may further include transmitting an account registration request including the user information when the user's account for the application is unregistered.

According to various embodiments, the method may further include transmitting information measured through at least one of a motion sensor and a biosensor of the wearable electronic device to the external electronic device via the short-range wireless communication.

An electronic device (e.g., the electronic device 250 of FIG. 2) according to various embodiments may include a display (e.g., the display 255 of FIG. 2), a communication circuit for short-range wireless communication (e.g., the communication circuit 252 of FIG. 2), a positioning sensor (e.g., the positioning sensor 253 of FIG. 2), and at least one processor (e.g., the processor 251 of FIG. 2) operatively connected to the display, the communication circuit, and the positioning sensor. The at least one processor may be configured to display a first execution screen of an application through the display while a first user wearing a first wearable electronic device is logged in to a first account of the application, detect a login event of a second user wearing a second wearable electronic device, based on whether the location of the second user is included in an automatic login range for the application, execute the second user's login to a second account of the application according to detection of the login event of the second user, and display a second execution screen of the application through the display according to execution of a multi-user login including the first user and the second user.

According to various embodiments, the at least one processor may be configured to detect a logout event based on whether the second user is out of the automatic login range, and execute logout of the second user from the second account according to detection of the logout event.

According to various embodiments, the automatic login range may be identified based on at least one of identification information of the application and characteristic information of the application.

According to various embodiments, the automatic login range may be prestored in the electronic device or the second wearable electronic device.

According to various embodiments, the at least one processor may be configured to measure a location of a third user wearing a third wearable electronic device with respect to the electronic device, detect a login event of the third user based on whether the measured location is included in the automatic login range, execute the third user's login to a third account of the application according to detection of the login event of the third user, and display, through the display, a third execution screen of the application according to a multi-user login including the first user, the second user, and the third user.

What is claimed:

1. A wearable electronic device comprising:
   communication circuitry;
   a positioning sensor; and
   memory;
   at least one processor; and
   wherein the memory stores instructions that, when executed by the at least one processor, cause the wearable electronic device to:
   establish, via the communication circuitry, short-range wireless communication connection between the wearable electronic device and an external electronic device, according to the wearable electronic device worn by a user approaches the external electronic device;
   receive, via the short-range wireless communication connection, identification information of an application from the external electronic device;
   identify an automatic login range of the application based on pre-stored location-based login information, the identification information of the application, and characteristic information of the application, wherein the automatic login range comprises a designated distance and a designated angle;
   determine, via the positioning sensor, a location of the wearable electronic device relative to the external electronic device; and
   transmit, via the short-range wireless communication connection to the external electronic device, user information that is used to automatically log into an account related to the application, based on the determined location being within the automatic login range.

2. The wearable electronic device of claim 1, wherein the positioning sensor comprises an ultra-wideband (UWB) sensor.

3. The wearable electronic device of claim 1, wherein the automatic login range is identified based both of the identification information of the application and the characteristic information of the application.

4. The wearable electronic device of claim 1, wherein the at least one processor is configured to execute the automatic log into the account related to the application through the wearable electronic device based on the determined location being within the automatic login range.

5. The wearable electronic device of claim 1, wherein the instructions, when executed by the at least one processor, cause the wearable electronic device to, based on the determined location being out of the automatic login range, at least one of (i) request logout of the user from the external electronic device and (ii) execute logout of the user through the wearable electronic device.

6. The wearable electronic device of claim 1, wherein the determined location comprises at least one of:
   a distance between the wearable electronic device and the external electronic device; and
   an angle between the wearable electronic device and the external electronic device.

7. The wearable electronic device of claim 1, further comprising at least one of a motion sensor and a biosensor,
   wherein the instructions, when executed by the at least one processor, cause the wearable electronic device to transmit information measured through the at least one of the motion sensor and the biosensor to the external electronic device via the short-range wireless communication.

8. The wearable electronic device of claim 1, wherein instructions, when executed by the at least one processor, cause the wearable electronic device to use a fixed default value as the automatic login range in response to the location-based login information not including an automatic login range corresponding to the identification information.

9. A method for operating a wearable electronic device, the method comprising:
   establishing a short-range wireless communication connection between the wearable electronic device and an external electronic device, according to the wearable electronic device worn by a user approaches the external electronic device;

receiving, via the short-range wireless communication connection, identification information of an application from the external electronic device;

identifying an automatic login range of the application based on pre-stored location-based login information, the identification information of the application, and characteristic information of the application, wherein the automatic login range comprises a designated distance and a designated angle;

determining, via a positioning sensor of the wearable electronic device, a location of the wearable electronic device relative to the external electronic device; and transmitting, via the short-range wireless communication connection to the external electronic device, user information that is used to automatically log into an account related to the application based on the determined location being within the automatic login range.

10. The method of claim 9, wherein the positioning sensor comprises an ultra-wideband (UWB) sensor.

11. The method of claim 9, wherein the automatic login range is identified based on both of the identification information of the application and the characteristic information of the application.

12. The method of claim 9, further comprising executing the automatic log into the account related to the application through the wearable electronic device based on the determined location being within the automatic login range.

13. The method of claim 9, further comprising at least one of requesting logout of the user from the external electronic device and executing logout of the user through the wearable electronic device based on the determined location being out of the automatic login range.

14. The method of claim 9, wherein the determined location comprises at least one of:
a distance between the wearable electronic device and the external electronic device; and
an angle between the wearable electronic device and the external electronic device.

15. The method of claim 9, further comprising transmitting information measured through at least one of a motion sensor and a biosensor of the wearable electronic device to the external electronic device via the short-range wireless communication.

16. An electronic device comprising:
a display;
communication circuitry for short-range wireless communication;
a positioning sensor;
memory;
at least one processor; and
wherein the memory stores instructions that, when executed by the at least one processor, cause the electronic device to:
display a first execution screen of an application through the display while a first user wearing a first wearable electronic device is logged in to a first account of the application;
detect a login event of a second user wearing a second wearable electronic device, based on the location of the second user being within an automatic login range for the application, wherein the automatic login range comprises a designated distance and a designated angle;
execute the second user's login to a second account of the application according to detection of the login event of the second user; and
display a second execution screen of the application through the display according to execution of a multi-user login including the first user and the second user.

17. The electronic device of claim 16, wherein the instructions, when executed by the at least one processor, cause the electronic device to:
detect a logout event based on the second wearable electronic device being out of the automatic login range; and
execute logout of the second user from the second account according to detection of the logout event.

18. The electronic device of claim 16, wherein the automatic login range is identified based on at least one of identification information of the application and characteristic information of the application.

19. The electronic device of claim 16, wherein the automatic login range is prestored in the electronic device or the second wearable electronic device.

20. The electronic device of claim 16, wherein the instructions, when executed by the at least one processor, cause the electronic device to:
determine a location of a third user wearing a third wearable electronic device relative to the electronic device;
detect a login event of the third user based on the detected location being within the automatic login range;
execute the third user's login to a third account of the application according to detection of the login event of the third user; and
display, through the display, a third execution screen of the application according to a multi-user login including the first user, the second user, and the third user.

* * * * *